United States Patent
Moiseyev et al.

(10) Patent No.: US 8,466,427 B2
(45) Date of Patent: Jun. 18, 2013

(54) HIGH HARMONICS GENERATION OF LIGHT

(75) Inventors: Nimrod Moiseyev, Haifa (IL); Avner Fleischer, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 595 days.

(21) Appl. No.: 12/451,354

(22) PCT Filed: May 5, 2008

(86) PCT No.: PCT/IL2008/000615
§ 371 (c)(1),
(2), (4) Date: Apr. 22, 2010

(87) PCT Pub. No.: WO2008/139449
PCT Pub. Date: Nov. 20, 2008

(65) Prior Publication Data
US 2010/0207034 A1     Aug. 19, 2010

Related U.S. Application Data

(60) Provisional application No. 60/924,314, filed on May 9, 2007.

(51) Int. Cl.
*G01J 1/42*    (2006.01)

(52) U.S. Cl.
USPC ........................................................ 250/393

(58) Field of Classification Search
USPC ........................................................ 250/393
See application file for complete search history.

(56) References Cited

U.S. PATENT DOCUMENTS

| | | | | |
|---|---|---|---|---|
| 5,341,805 | A | * 8/1994 | Stavridi et al. | 600/316 |
| 2002/0172235 | A1 | 11/2002 | Chang et al. | |
| 2010/0289190 | A1* | 11/2010 | Kawakami et al. | 264/496 |

FOREIGN PATENT DOCUMENTS

WO     WO 2008/139449     11/2008

OTHER PUBLICATIONS

Gaarde et al., "Spatial separation of large dynamical blue shift and harmonic geneartion," Aug. 14, 2006, zrXiv:physics/0606004v2 [physics.atom-ph].*
M. Murakami, "High harmonic generation by short laser pulses: time-frequency behavior and applications to attophysics," May 2006, Dissertation, Department of Physics and Astronomy, Louisiana State University.*
International Preliminary Report on Patentability Dated Nov. 19, 2009 From the International Bureau of WIPO Re.: Application No. PCT/IL2008/000615.
International Search Report Dated Sep. 3, 2008 and Received Sep. 18, 2008 From the International Searching Authority Re.: Application No. PCT/IL2008/000615.
Written Opinion Dated Sep. 3, 2008 and Received Sep. 18, 2008 From the International Searching Authority Re.: Application No. PCT/IL2008/00615.
Agostini et al. "The Physics of Attosecond Light Pulses", Reports on Progress in Physics, XP020025061, 67(6): 813-855, Jun. 1, 2004. Abstract, Figs.13, 14, § [3.3.3].
Corkum "Plasma Perspective on Strong-Field Multiphoton Ionization", Physical Review Letters, 71(13): 1994-1997, 1993.

(Continued)

*Primary Examiner* — Kiho Kim

(57) ABSTRACT

A method of generating light is disclosed. The method comprises irradiating a substance with first optical field of a first frequency and second optical field of a second frequency. The second frequency being higher than a cutoff frequency of a harmonics generation spectrum characterizing the interaction of the substance with the first optical field.

48 Claims, 11 Drawing Sheets

OTHER PUBLICATIONS

Dudovich et al. "Measuring and Controlling the Birth of Attosecond XUV Pulses", Nature Physics, 2: 781-786, 2006.

Eichmann et al. "Generation of Short-Pulse Tunable XUV Radiation by High-Order Frequency Mixing", Physical Review A, 50(4): R2834-2837, 1994.

Fleischer et al. "Attosecond Laser Pulse Synthesis Using Bichromatic High-Order Harmonic Generation", Physical Review A, 74: 053806-1-053806-7, 2006.

Gaarde et al. "Theory of High-Order Sum and Difference Frequency Mixing in a Strong Bichromatic Laser Field", Physical Review A, 54(5): 4236-4248, 1996.

Kitzler et al. "Qunatum Theory of Attosecond XUV Pulse Measurement by Laser Dressed Photoionization", Physical Review Letters, 88(17): 173904-1-173904-4, 2002.

Lewenstein et al. "Theory of High-Harmonic Generation by Low-Frequency Laser Fields", Physical Review A, 49(3): 2117-2132, 1994.

Papadogiannis et al. "Two-Photon Ionization of HE Trough a Superposition of Higher Harmonics", Physical Review Letters, 90(13): 133902-1-13902-4, 2003.

Pfeifer et al. "Heterodyne Mixing of Laser Fields for Temporal Gating of High-Order Harmonic Generation", Physical Review Letters, PRL 97: 163901-1-163901-4, 2006.

Pfeifer et al. "Single Attosecond Pulse Generating in the Multicycle-Driver Regime by Adding a Weak Second-Harmonic Field", Optics Letters, 31(7): 975-977, 2006.

Schafer et al. "Above Threshold Ionization Beyond the High Harmonic Cutoff", Physical Review Letters, 70(11): 1599-1602, 1993.

Zeitoun et al. "A High-Intensity Highly Coherent Soft X-Ray Femtosecond Laser Seeded by a High Harmonic Beam", Nature, 431: 426-429, 2004.

Communication Pursuant to Article 94(3) EPC Dated Apr. 20, 2010 From the European Patent Office Re.: Application No. 08738316.2.

Response Dated Oct. 10, 2010 to Communication Pursuant to Article 94(3) EPC of Apr. 20, 2010 From the European Patent Office Re.: Application No. 08738316.2.

Eichmann et al. "Generation of Short-Pulse Tunable XUV Radiation by High-Order Frequency Mixing", Physical Review A, General Physics, XP009103844, 50(4): R2834-2837, 1994. Abstract, Fig.1.

* cited by examiner

HIGH HARMONICS GENERATION OF LIGHT

RELATED APPLICATIONS

This Application is a National Phase of PCT Patent Application No. PCT/IL2008/000615 having International filing date of May 5, 2008, which claims the benefit of U.S. Provisional Patent Application No. 60/924,314 filed on May 9, 2007. The contents of the above Applications are all incorporated herein by reference.

FIELD AND BACKGROUND OF THE INVENTION

The present invention, in some embodiments thereof, relates to the generation of light and, more particularly, but not exclusively, to the generation of high harmonics of infrared light.

Lasers can be categorized by the ranges of wavelengths characterizing the electromagnetic spectrum in which they operate. These ranges include the infrared (IR) range, visible range and ultraviolet (UV) range. The greatest number of laser light sources is found in the IR and visible ranges of the spectrum while fewer options are available in the UV range.

The UV range is important because photons of these wavelengths contain enough energy to break chemical bonds and because short wavelengths can be focused more precisely than longer wavelengths. Additionally, the short wavelengths characterizing the UV range enable high resolution. UV light sources are used in applications such as spectroscopy, optical testing, medicine, machining and lithography.

Common UV sources include lasers that rely upon the harmonic conversion of light from sources in the visible or IR ranges. Harmonic generation provides an alternative to direct generation of ultraviolet light. In this approach light is produced in the visible or IR regions and then converted to shorter wavelengths via a nonlinear optical process. In these devices, the frequency of the output is typically doubled, and the governing process is termed second harmonic generation (SHG).

Intense linearly-polarized monochromatic IR laser pulses which are focused onto a gas of atoms can also lead to the emission of photons at higher harmonics, a phenomenon known as high harmonic generation (HHG). Harmonic generation spectra typically have a non-linear region in which the intensity of optical output decreases as a function of the harmonic order, followed by a "plateau" region in which the intensity of the harmonics remain approximately constant over many orders. The highest frequency of the harmonic generation spectrum (HGS) is referred to as the cut-off frequency of the spectrum, or the plateau's cut-off. When expressed in energy units, the plateau's cut-off is the maximum photon energy producible via HHG.

A semiclassical three-step model (also known as "recollision model") explains the HHG phenomenon as follows. Under the influence of the intense laser field, the electron of an atom tunnels out of the modified Coulomb potential to the continuum, gains kinetic energy as a free particle in the field and may recombine with the parent ion to release the sum of its kinetic energy and the ionization potential as a high energy photon (to this end see, e.g., P. B. Corkum, Phys. Rev. Lett., 71:1994, 1993; Lewenstein et al., Phys. Rev. A, 49:2117, 1994; and Schafer et al., Phys. Rev. Lett., 70:1599, 1993).

Known in the art are techniques for achieving HGS by contaminating a strong IR field with a second or more higher-frequency, typically in the UV range [Pfeifer et al. Phys. Rev. Lett. 97:163901, 2006; Pfeifer et al., Optics Letters 31:975, 2006; Dudovich et al., Nature Physics 2:781, 2006; Eichman et al., Phys. Rev. A50:R2834, 1994; and Gaarde et al., Phys. Rev. A54:4236, 1996]. In these techniques, the frequency of the additional UV field is in the plateau of the HGS as would be generated by the IR field alone. These techniques were successfully employed for inducing stimulated emission, single-photon ionization or multi-photon ionization [Kitzler et al., Phys. Rev. Lett, 88:173904, 2002; Zeitoun et al., Nature 431:426, 2004, Papadogiannis et al., Phys. Rev. Lett. 90:133902, 2003]

SUMMARY OF THE INVENTION

Traditional techniques for enhancements of high harmonics include the contamination of a primary IR field with a secondary UV field which is in the plateau of the HGS as would be generated by the primary IR field alone. The secondary UV field increases the efficiency of the existing IR harmonics. It has been postulated that the secondary UV field either switches the initial step in the generation of high harmonics from tunnel ionization to single UV-photon ionization (which is more efficient), or that it assists the tunneling by transferring population to an excited state (from which tunneling is more efficient). In any of the above postulations, the secondary UV field assists the ionization resulting in more atoms which participate in the HHG process and an enhanced HHG signal.

As demonstrated hereinunder, the present inventors have successfully proved that the phenomenon of HHG enhancement via a secondary field can also be attributed to single atoms, contrary to the common believe that the enhancement is essentially macroscopic. In a search for improved HHG technique, the present inventors employed the new understanding of photon emission at atomic level and devised a novel technique for the generation of light.

While conceiving the present invention it was uncovered that it is advantageous to generate light by irradiating a substance with two optical fields, where the second field has a frequency which is higher than the cutoff of the HGS as would be generated by the first field alone. It was found by the present inventors that this technique can generate new harmonics (i.e., harmonics which would have been either suppressed or absent had the substance been irradiated solely by the first frequency). In particular, this technique can provide harmonics of frequencies which are beyond the maximal frequency of the HGS as would be generated by the first field alone. The new harmonics can include frequencies extending into the extreme UV range and beyond. In various exemplary embodiments of the invention the HGS emitted by the substance one irradiated by the first and second optical fields includes at least one harmonic having a frequency in the X-ray range.

The present inventors have demonstrated that the emission times of the new harmonics are correlated with those of the old harmonics. Thus, some embodiments of the present invention can be used for increasing the bandwidth of harmonics which are emitted at certain times. The advantage of such increment is that it can be exploited for the generation of short pulses of light (for example, pulses shorter than 160 attoseconds, or shorter than 120 attoseconds, or shorter than 80 attoseconds, for example, or shorter than 100 attoseconds, or shorter than 60 attoseconds e.g., pulses of about 40 attoseconds).

Thus, according to an aspect of some embodiments of the present invention there is provided a method of generating light, comprising irradiating a substance with first optical field of a first frequency and second optical field of a second frequency, the second frequency being higher than a cutoff frequency of a harmonics generation spectrum characterizing the interaction of the substance with the first optical field.

According to an aspect of some embodiments of the present invention there is provided apparatus for generating light, comprising a substance, a first light source for generating in the direction of the substance first optical field of a first frequency and a second light source for generating in the direction of the substance second optical field of a second frequency, the second frequency being higher than a cutoff frequency of a harmonics generation spectrum characterizing the interaction of the substance with the first optical field.

According to an aspect of some embodiments of the present invention there is provided an imaging system for imaging an object or a scene, comprising the apparatus described herein and an imager configured for imaging the object or the scene based on light emitted thereby, reflected therefrom or transmitted therethrough.

According to an aspect of some embodiments of the present invention there is provided a spectroscopy system for determining the concentration of analyte in a sample, comprising the apparatus described herein of claim 2 arranged to direct light to the sample, and a light detector configured for detecting light emitted by, reflected from or transmitted through the sample.

According to an aspect of some embodiments of the present invention there is provided a lithography system, comprising the apparatus described herein arranged to direct a light beam to a substrate to form patterns thereon, and alignment mechanism for aligning the substrate with the light beam.

According to an aspect of some embodiments of the present invention there is provided a micro-machining system, comprising the apparatus described herein.

According to some embodiments of the present invention the first frequency is in the infrared range.

According to some embodiments of the present invention the second frequency is in the ultraviolet range.

According to some embodiments of the present invention the second frequency is in the extreme ultraviolet range.

According to some embodiments of the present invention the second frequency is in the X-ray range.

According to some embodiments of the present invention the ratio between the second frequency and the first frequency is an integer.

According to some embodiments of the present invention the ratio between the second frequency and the first frequency is non-integer.

According to some embodiments of the present invention the first optical field has an intensity which is substantially higher than the intensity of the second optical field. For example, the intensity of the first optical field can be higher than the intensity of the second optical field by two, three or more orders of magnitude.

According to some embodiments of the present invention the first optical field has an intensity which approximately equals the intensity of the second optical field. For example, the ratio between the intensities of the first and second optical fields can be from about 0.1 to about 10.

According to some embodiments of the present invention the first optical field has an intensity which is lower than the intensity of the second optical field.

According to some embodiments of the present invention a combination of the first optical field and the second optical field results in emission of a harmonics generation spectrum from the substance, the emitted harmonics generation spectrum having at least one harmonic which is enhanced relative to a respective harmonic of the harmonics generation spectrum that would have been emitted had the substance been irradiated solely by the first optical field.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware; by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figures 1A, 1B:
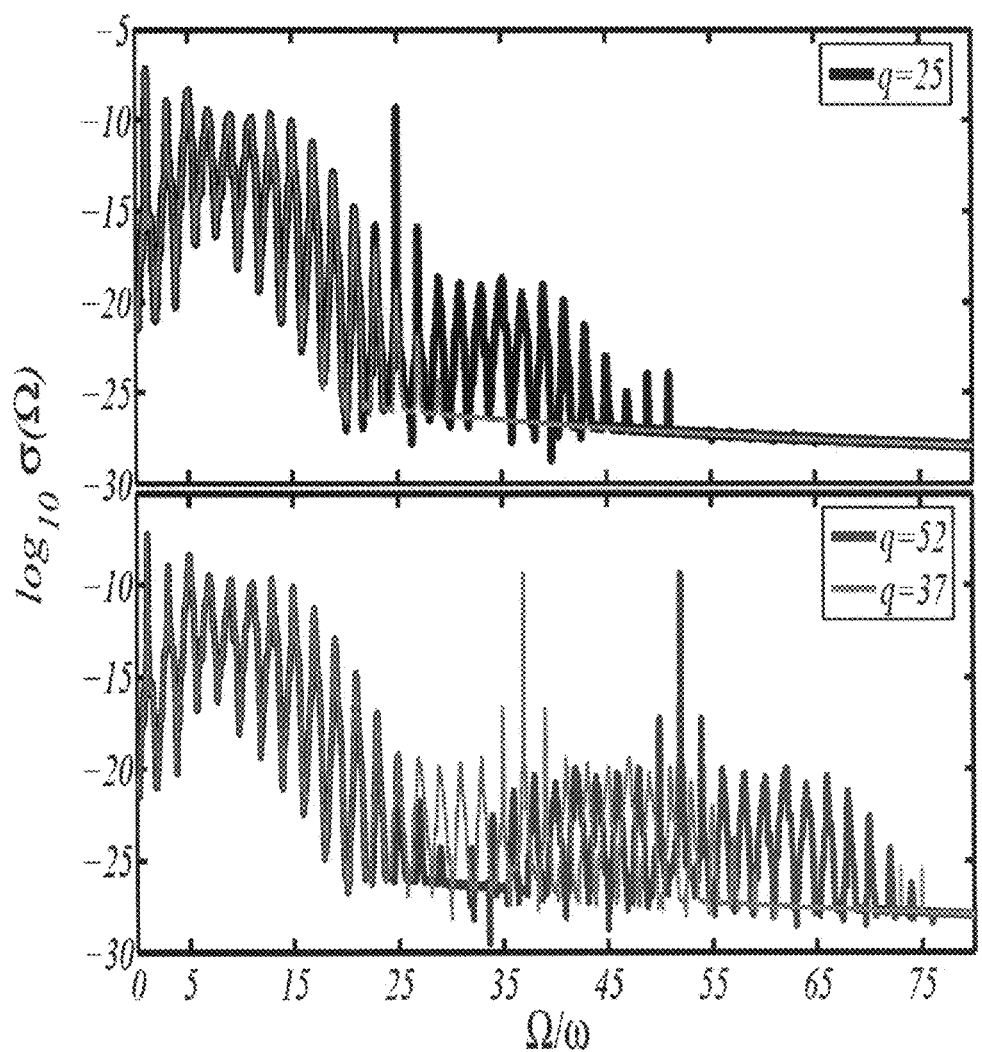
Figure 4:
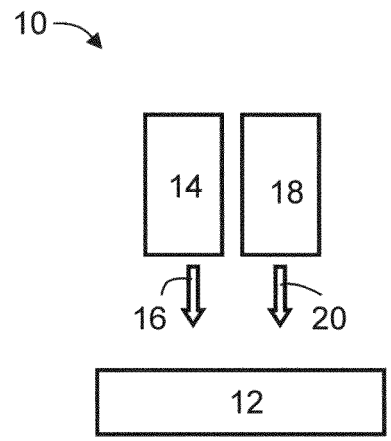
Figure 5:
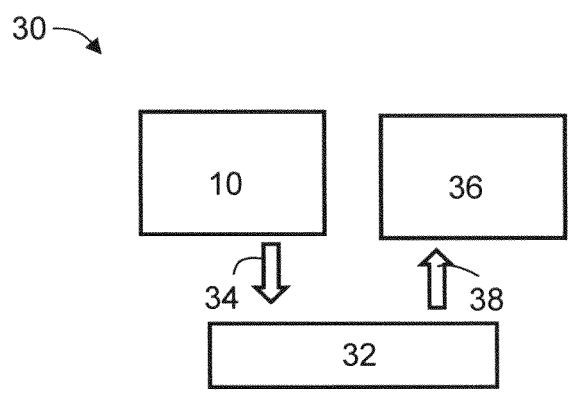
Figure 6:
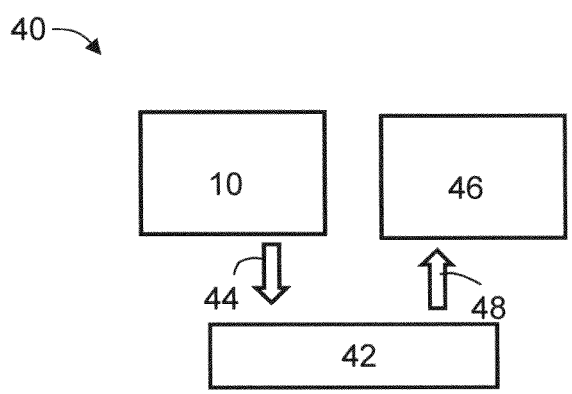
Figure 7:
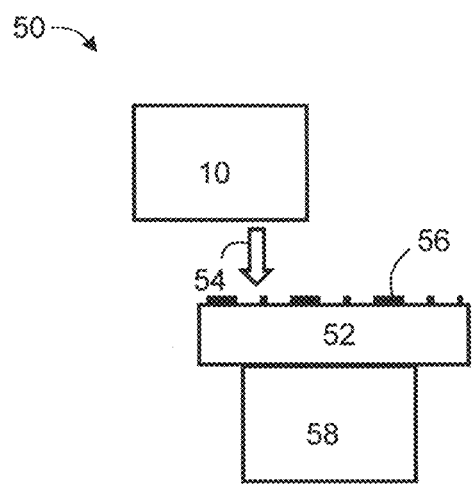
Figure 8:
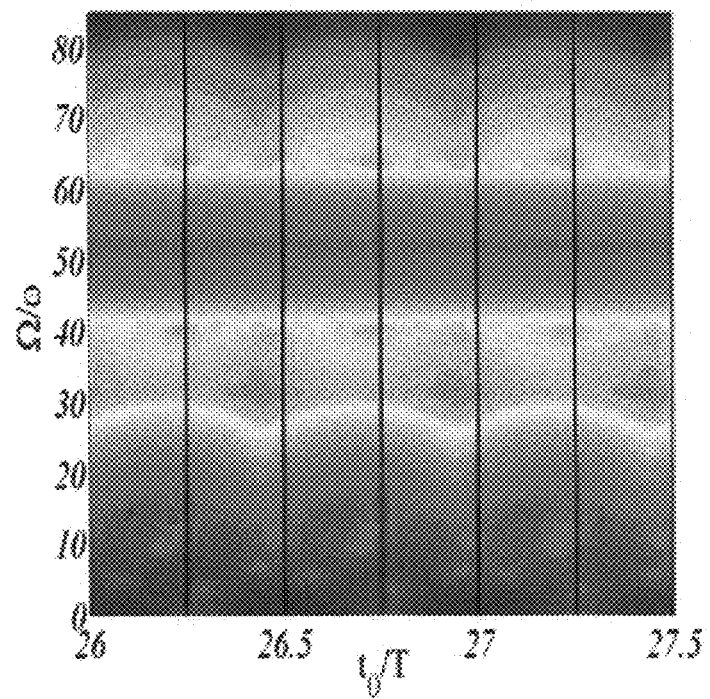
Figure 11:
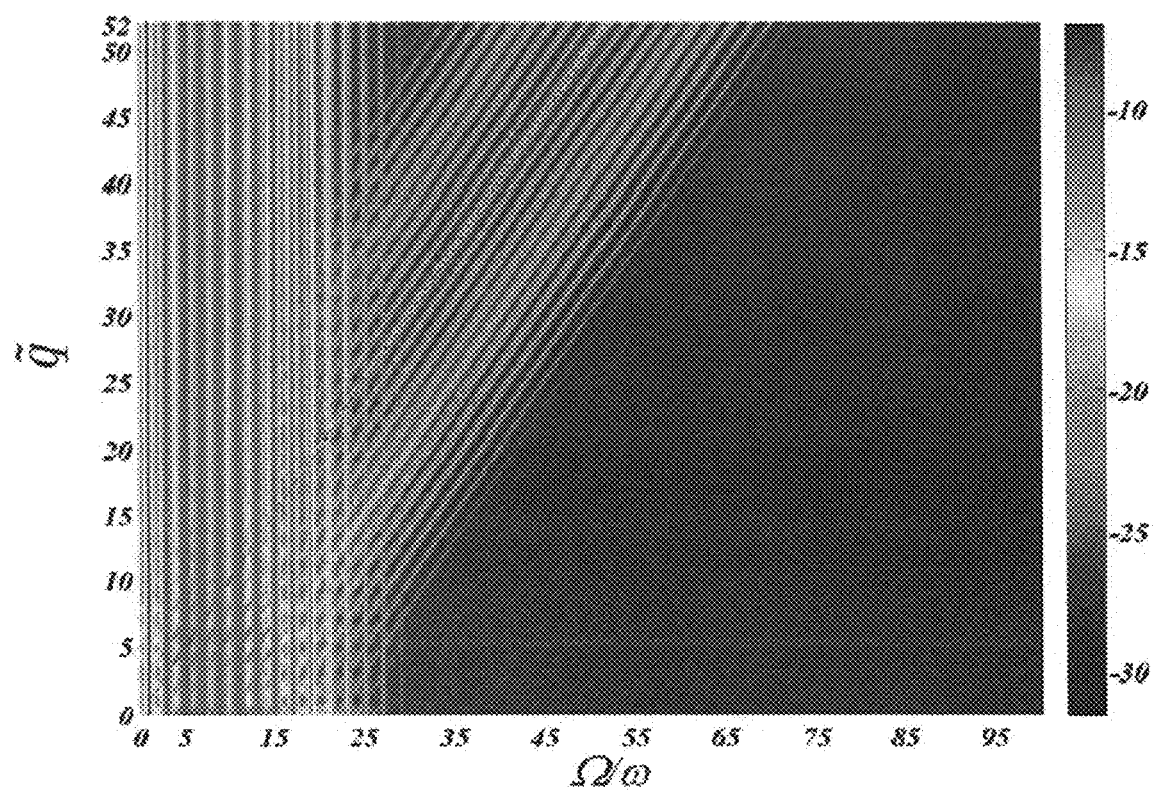
Figure 12:
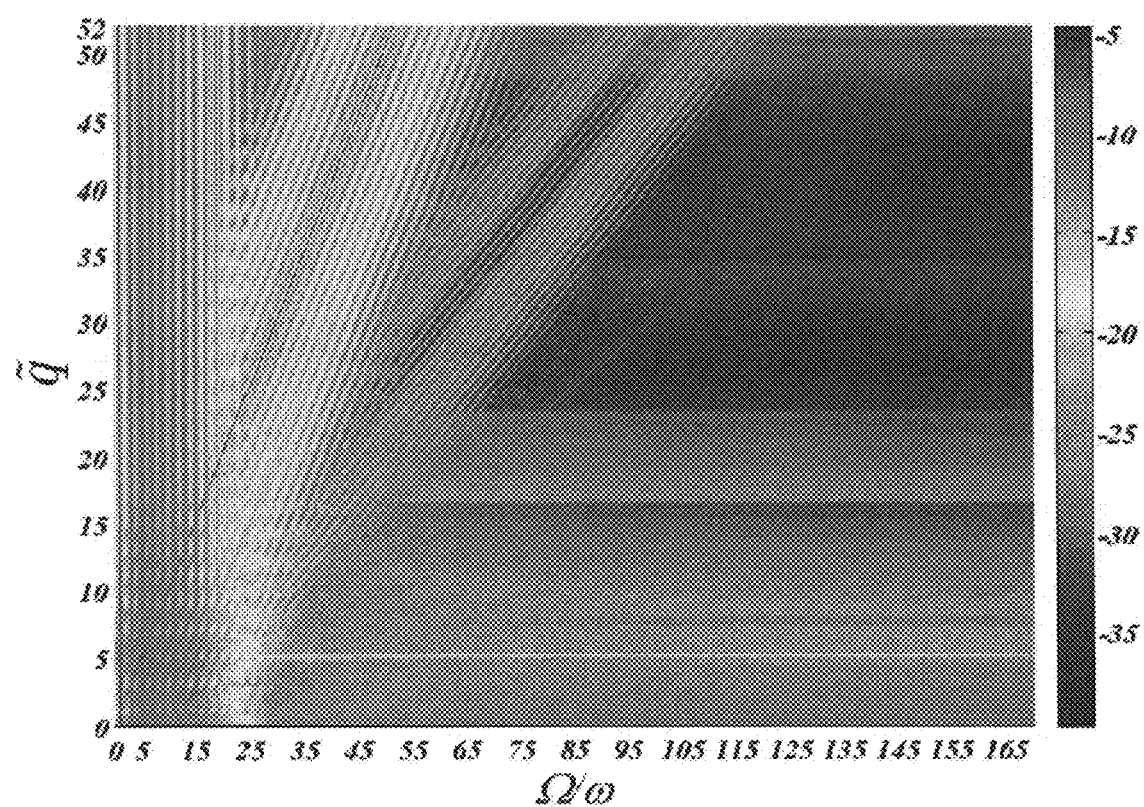
Figure 13:
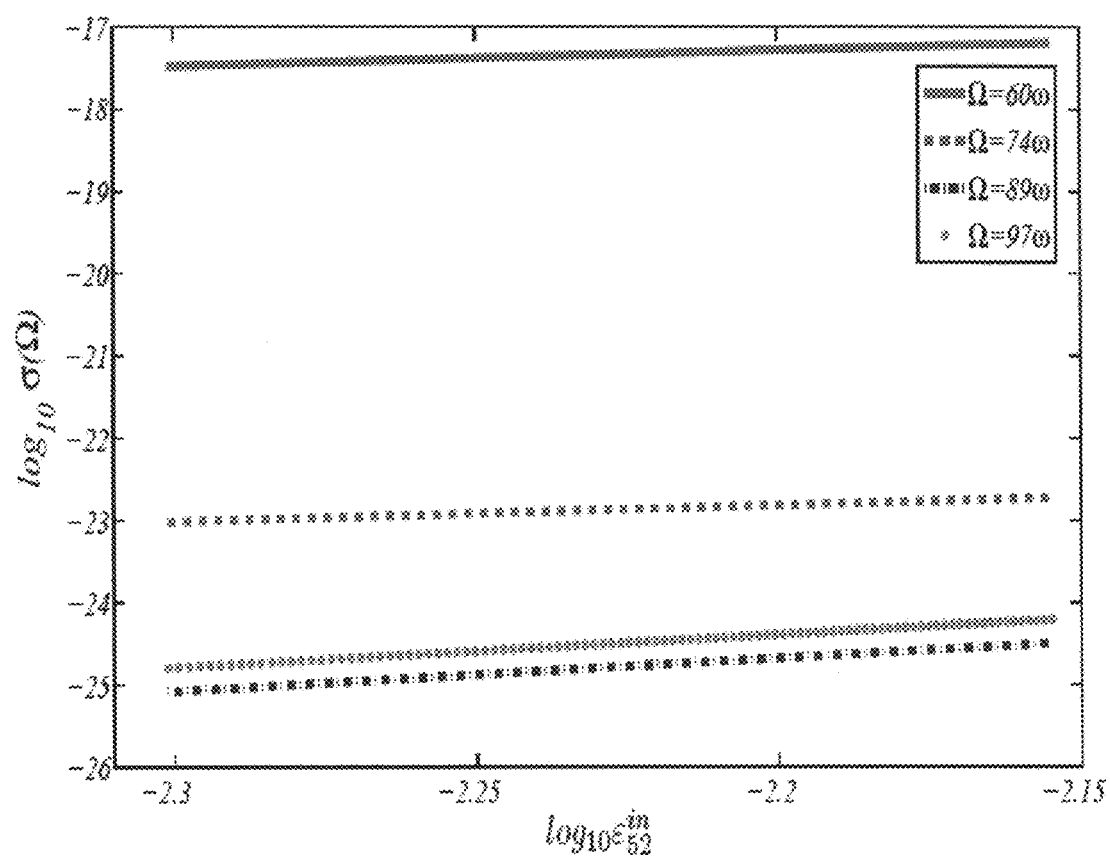
Figure 14:
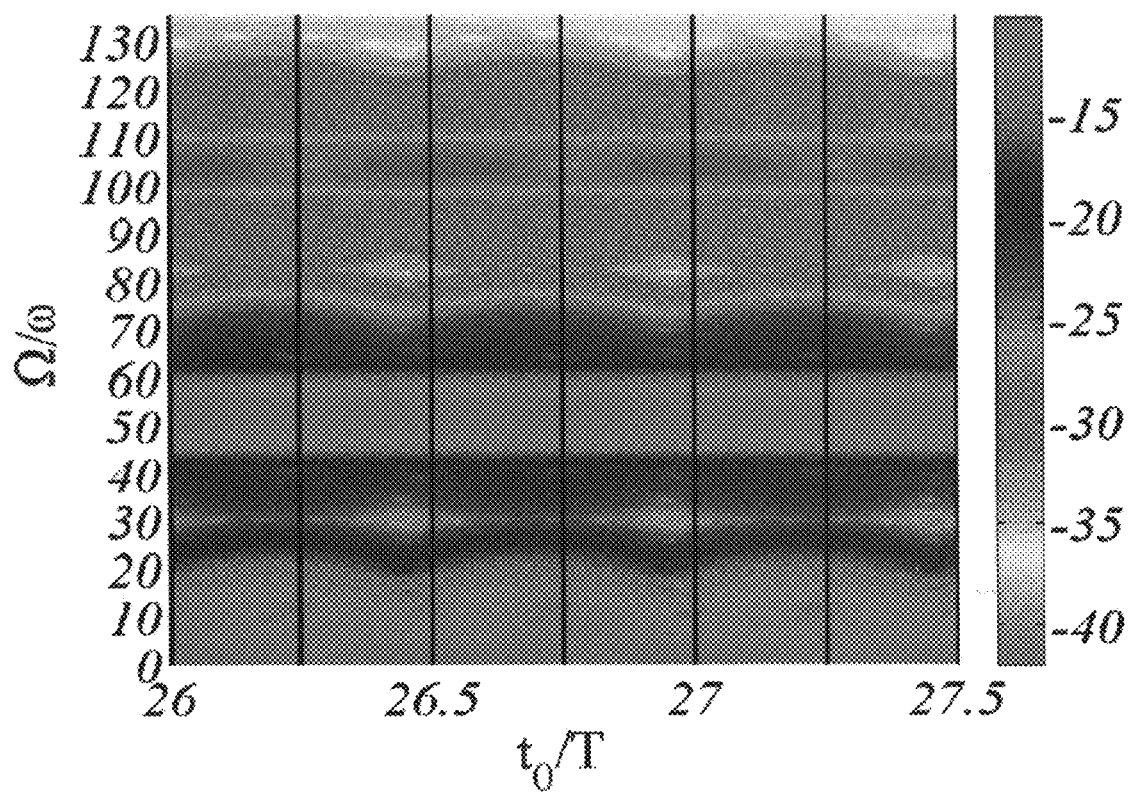
Figure 15:
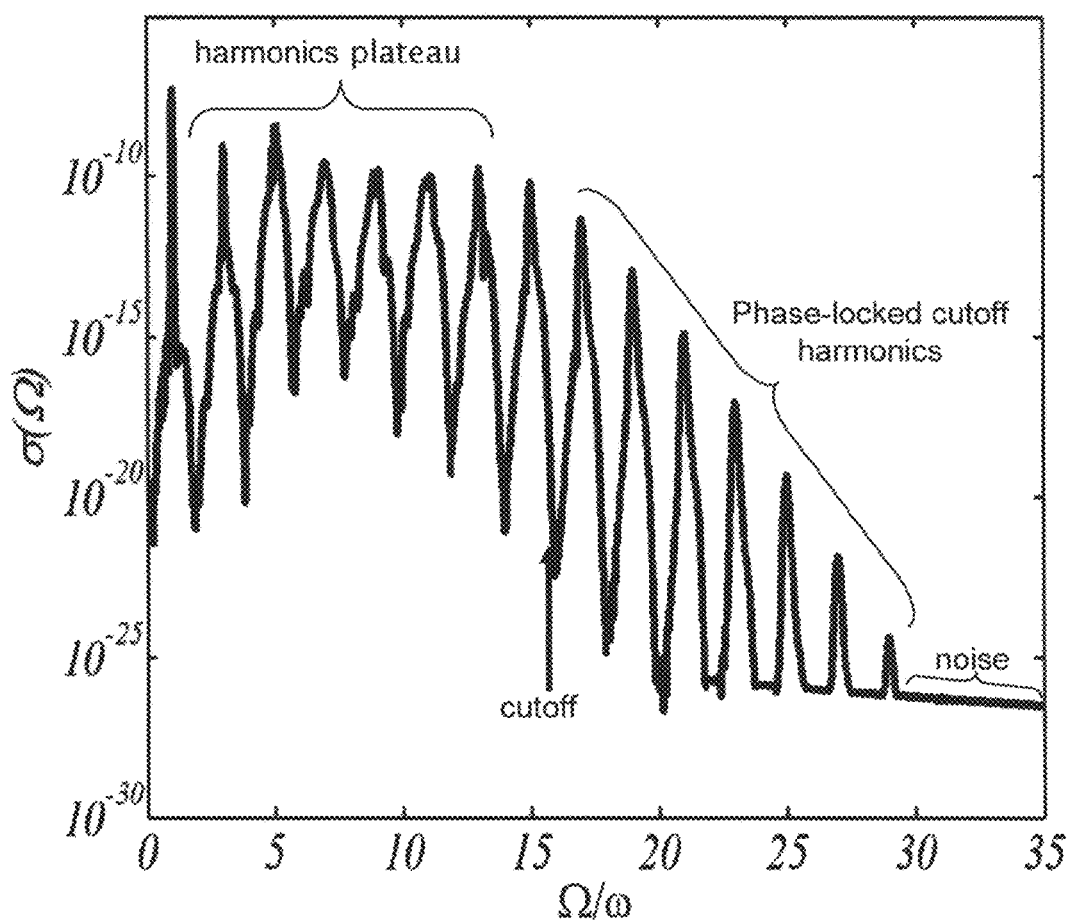

FIGS. 1*a-b*, 2, 3, 9*a-d* and 10*a-b* show quantum mechanical simulations demonstrating harmonics generation spectra generated from Xe atom irradiated by an IR field and a XUV field, according to various exemplary embodiments of the present invention;

FIG. 4 is a schematic illustration of apparatus for generating light, according to various exemplary embodiments of the present invention;

FIG. 5 is a schematic illustration of an imaging system, according to various exemplary embodiments of the present invention;

FIG. 6 is a schematic illustration of spectroscopy system, according to various exemplary embodiments of the present invention;

FIG. 7 is a schematic illustration of lithography system, according to various exemplary embodiments of the present invention;

FIG. 8 shows a top view of the absolute square of a Gabor-transformed acceleration expectation value of the quantum mechanical simulation described in FIG. 1b;

FIG. 11 shows a top view of HGS spectra of obtained by the quantum mechanical simulation described in relation to FIGS. 9a-d, according to various exemplary embodiments of the present invention;

FIG. 12 shows a top view of HGS spectra of obtained by the quantum mechanical simulation described according to various exemplary embodiments of the present invention in relation to FIGS. 10a-b;

FIG. 13 is log-log plot of the intensity of different harmonics obtained by the quantum mechanical simulation described according to various exemplary embodiments of the present invention in relation to FIGS. 10a-b;

FIG. 14 shows the time-frequency distribution of high harmonics obtained from time-dependent acceleration expectation value whose spectrum is given according to various exemplary embodiments of the present invention in FIG. 10b; and FIG. 15 is an illustrative example of an unmodified HGS, including a harmonics plateau, a cutoff frequency, several cutoff harmonics and a maximal frequency.

DESCRIPTION OF SPECIFIC EMBODIMENTS OF THE INVENTION

The present invention, in some embodiments thereof, relates to the generation of light and, more particularly, but not exclusively, to the generation of high harmonics of infrared light.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present embodiments comprise a method suitable for generating light. A substance, preferably but not obligatorily a gaseous substance is irradiated with a first optical field of a first frequency and second optical field of a second frequency, such that light is emitted from the substance. When a gaseous substance is employed, the gas is typically but not obligatorily a noble gas, for example Ar, Xe or Kr. The substance is preferably transparent in some spectral band around the frequency of the second optical field. Also contemplated are other types of substances, including, without limitation, nanostructures such as nanoparticles or nanotubes (e.g., carbon nanotubes).

The optical fields can be laser lights which are preferably focused onto the substance. In various exemplary embodiments of the invention a synchrotron light source is used for generating at least one of the optical fields.

The light emitted from the substance can include a harmonics generation spectrum. In various exemplary embodiments of the invention the harmonics generation spectrum emitted as a result of the irradiation by both the first optical field and the second optical field includes harmonics not present in the harmonics generation spectrum that would have been emitted had the substance been irradiated solely by the first optical field.

The emitted harmonics generation spectrum (as a result of the irradiation by both optical fields) is referred to herein as the "modified HGS." The harmonics generation spectrum that would have been emitted as a result of the interaction of the substance with the first optical field and in the absence of the second optical field is referred to herein as the "unmodified HGS."

Thus, the unmodified HGS characterizes the interaction of the substance with the first optical field and the modified HGS characterizes the interaction of the substance with both the first and the second optical fields.

The unmodified HGS is defined between a fundamental frequency (first harmonic) and a maximal frequency. The unmodified HGS also includes a cutoff frequency which is typically lower than the maximal frequency of the spectrum. In some cases the maximal frequency is also the cutoff frequency.

A cutoff frequency of a harmonics generation spectrum is a well known term, and those skilled in the art of high harmonics generation will know how to identify such cutoff frequency. Generally, a cutoff frequency is the frequency at which the harmonic plateau of the harmonics generation spectrum exhibits an substantially abrupt drop in terms of light intensity. The intensity of the harmonics which appear beyond the cutoff frequency decrease fast with increasing harmonic order. Thus, Beyond the cutoff threshold, harmonics are either suppressed of absent.

A harmonic is said to be "absent" from the spectrum if its intensity is not larger than the noise reading of the measuring device used to detect the HGS (or the noise associated with numerical simulation if such simulation is performed).

A harmonic is said to be "suppressed" when the ratio between the optical power associated with this harmonic and the average optical power over the harmonic plateau of the spectrum is below some predetermined cutoff threshold. Representative examples of such cutoff threshold include, without limitation, 10 or 100 or 1000. The term "cutoff harmonics" is used herein to describe (suppressed) harmonics which are beyond the cutoff frequency. An illustrative example of an unmodified HGS, including a harmonics plateau, a cutoff frequency, several cutoff harmonics and a maximal frequency is presented in FIG. 15. The HGS is shown as a graph of the base-10 logarithm of the power $\sigma(\Omega)$ of the harmonics as a function of the dimensionless ratio $\Omega/\omega$ where $\Omega$ is the frequency of the respective harmonics, and $\omega$ is the frequency of the first optical field. The unmodified HGS includes odd harmonics of w, where the cutoff harmonic is at $\Omega/\omega=15$, namely the cutoff frequency equals $15\omega$. The maximal frequency equals $29\omega$ (i.e., the 29th harmonic of the HGS). The signal above the 29th harmonic is considered noise.

In various exemplary embodiments of the invention the maximal frequency of the modified HGS is significantly larger (e.g., by a factor of 1.5, or 2 or 5 or 10 or more) than the maximal frequency of the unmodified HGS. In various exemplary embodiments of the invention the modified HGS includes at least one, more preferably two or more harmonics having a frequency in the X-ray range, typically, but not obligatorily the soft X-ray range.

Generally, denoting the first frequency by $\omega$, the second frequency is $q\omega$ with the provision that $q\omega$ is above the cutoff frequency of the unmodified HGS. Thus, q is substantially larger than 1. In some embodiments, $q>10$, more preferably $q>20$. In some embodiment, q is an integer (namely the second frequency is a harmonic of the first frequency), but it is not intended to limit the scope of the invention by imposing any limitations on the value or type of q other that the above provision. Thus, q can be an integer or non-integer.

In some embodiments of the present invention, the first frequency ω is in the IR range, typically but not obligatorily in the near IR range. However, this need not necessarily be the case, since, for some applications, it may not be necessary for the first frequency to be in this range. For example, the first frequency can be in the visible range.

The second frequency qω is preferably sufficiently high such that the frequency of the second light is significantly higher than the frequency of the first light. In some embodiments of the present invention the second frequency is in the UV range, preferably but not obligatorily in the extreme UV range.

The wavelengths associated with IR, visible, UV, XUV and X-ray ranges are typically as follows: light in the IR range typically has wavelengths ranging from about 700 nm to about 1 mm; light in the near IR range typically has wavelengths ranging from about 700 nm to about 1400 mm; light in the visible range typically has wavelengths ranging from about 400 nm to about 700 nm; light in the UV range typically has wavelengths ranging from about 10 nm to about 400 nm; light in the XUV range typically has wavelengths ranging from about 10 nm to about 120 nm; light in the X-ray range typically has wavelengths which are below 10 nm; and light in the soft X-ray range typically has wavelengths which are from about 1 nm to about 10 nm.

As used herein the term "about" refers to ±10%.

It was found by the inventors of the present invention that the modified HGS can be generated even when the intensity of the second optical field is substantially lower (e.g., three, four or more orders of magnitude lower) than the intensity of the first optical field. Yet, this need not necessarily be the case, since the modified HGS can be generated also when the intensities of the first and second optical fields are of the same order of magnitude.

For sufficiently large energy difference between the photons at frequency qω and photons at frequency ω, the second optical field influences the recombination step in the recollision model, but has minimal or no effect on the first and second steps of the recollision model (tunnel-ionization and propagation in the field, respectively). This can be explained by representing the expectation value of the electron's acceleration as a perturbation series, and associating the contributions of the harmonics with terms of the series. For example, it is demonstrated hereinunder that IR harmonics are originated from the zero-order term of the series while XUV harmonics are originated from the first-order and higher-order terms of the series.

The number of harmonics in the modified spectrum generally increases as a function of the intensity of the second optical field. It was found by the inventors of the present invention that the harmonics of the modified HGS appear in sets nq±[2K−1+mod(n, 2)], n=1, 2, 3, . . . , where K is an integer. Thus, the intensity of the second field can be judiciously selected in accordance with the desired modified HGS. It was further found that when q is integer and the intensity of the second optical field is sufficient to produce only the first set of new harmonics, the harmonics of the modified HGS appear in the set q±2K.

In some embodiments, the second optical field is applied externally. For example, He is known to produce higher harmonics than Ar. Thus, the second optical field can be the high harmonic output beam obtained from He (irradiated by a first optical beam), filtered such that the only frequencies that pass the filter are those which are absent from the HGS of Ar.

Representative examples of harmonics generation spectra generated by the teachings of the present embodiments are shown in FIGS. 1a-b, 2 and 3. The harmonics generation spectra in FIGS. 1a-b, 2 and 3 are presented on graphs showing the base-10 logarithm of the power σ(Ω) of the harmonics as a function of the dimensionless ratio Ω/ω where Ω is the frequency of the respective harmonics, and ω is the frequency of the first optical field.

Shown in FIGS. 1a-b are modified HGS's obtained from a time-dependent Schrödinger equation (TDSE) simulation of a 1D model Hamiltonian of Xe atom irradiated by a 50-oscillation sine-square pulse of bichromatic laser field composed of a strong laser field of frequency ω (corresponding to a wavelength λ=800 nm) and intensity of about $4.3 \times 10^{13}$ W/cm$^2$ and a weak laser field of frequency qω and amplitude and intensity of about $3.5 \times 10^8$ W/cm$^2$ for different integer values of q. FIGS. 1a-b show three values of q: q=25 [solid red line (dark gray line in grayscale)], q=37 [dotted green line (bright gray line in grayscale) line], q=52 [solid blue line (dark gray line in grayscale)]. For all values of g, the value of qω is in the XUV range. Also shown is the unmodified HGS (in the absence of the second laser field) is shown in the dotted black line (bright grey line in grayscale) where the position of the cutoff is at the 15th harmonic. Thus, in all three cases shown qω is above the cutoff frequency of the unmodified HGS.

Figure 2:
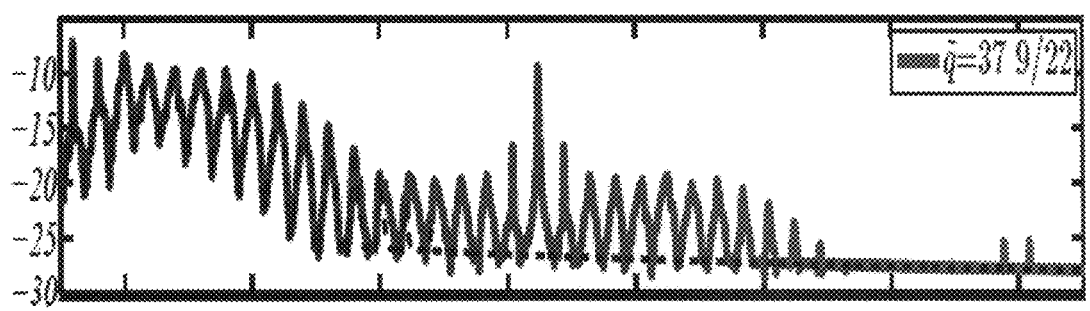
Figure 3:
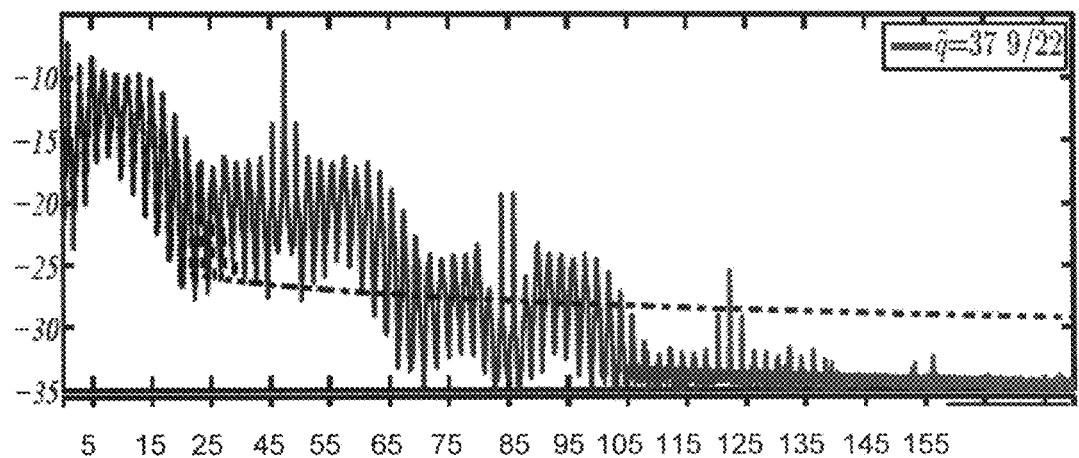

FIGS. 2 and 3 are representative example of modified HGS's obtained when the second frequency qω is not a harmonic of the first frequency ω (non-integer q). The spectra shown in FIG. 2 were obtained from a TDSE simulation of a 1D model Hamiltonian of Xe atom irradiated by a 50-oscillation sine-square pulse of bichromatic laser field composed of a strong laser field of frequency ω (corresponding to a wavelength λ=800 nm) and intensity of about $4.3 \times 10^{13}$ W/cm$^2$ and a weak laser field of frequency qω and amplitude and intensity of about $3.5 \times 10^8$ W/cm$^2$, where $$q = 37\frac{9}{22}.$$

The spectra shown in FIG. 3 were obtained in a similar technique as in FIG. 2 but with larger intensity for the second laser field (about $4.3 \times 10^{11}$ W/cm$^2$).

The modified HGS's are shown in FIGS. 2 and 3 as solid blue lines (dark gray lines in grayscale) and the unmodified HGS's are shown as dotted black lines (bright gray lines in grayscale). The position of the unmodified HGS cutoff is at the 15th harmonic. As demonstrated, the modified HGS's are extended relative to the unmodified HGS.

The HGS of the present embodiments can be used for generating short pulses of light. As demonstrated in the Examples section that follows, the technique of the present embodiments can generate new cutoff harmonics (see, e.g., FIG. 10b in which the modified HGS includes four new sets of cutoff harmonics). The new sets of cutoff harmonics increase the bandwidth and can be used for generating light pulses. The light pulses can be shorter than 160 attoseconds (as), or shorter than 120 as, or shorter than 80 as or shorter than 60 as, e.g., pulses of about 40 as. It is recognized that pulse durations which are attainable by conventional techniques are above 160 as. Thus, the technique of the present embodiments enables generation of pulses which are shorter than those attainable by conventional techniques.

The present embodiments contemplate generation of long as well as short pulse trains. The duration of each pulse in the train can be below 160 as further detailed hereinabove. Short pulse trains include, without limitation, trains having less than 10 pulses, more preferably less than 5 pulses, e.g., three pulses or less. In some embodiments, a single pulse is generated, which single pulse is preferably, but not obligatorily, shorter that 160 as, or shorter than 120 as, or shorter than 80 as, or shorter than 60 as, e.g., having a duration of about 40 as.

Control over the number of pulses in the train can be done using any technique known in the art. For example, the optical fields used for generating the HGS can be applied in short (e.g., a few fs) bursts, such as to control the number of possible recollision. Also contemplated is the use of bichromatic field as described, for example, in A. Fleischer and N. Moiseyev, "Attosecond laser pulse synthesis using bichromatic high-order harmonic generation," physical review A 74:053806 (2006), the contents of which are hereby incorporated by reference.

Reference is now made to FIG. 4 which is a schematic illustration of apparatus 10 for generating light. Apparatus 10 can be used for generating the HGS described above. Apparatus 10 comprises a substance 12, preferably but not obligatorily a gaseous substance, a first light source 14 for generating in the direction of substance 12 a first optical field 16 of a first frequency $\omega$ and a second light source 18 for generating in the direction of substance 12 a second optical field 20 of a second frequency $q\omega$. The second frequency is preferably higher than a cutoff frequency of the unmodified HGS.

The source light source which generates the second optical field can be a free-electron laser or a HHG-based source. For example, a Ti:sapphire laser, with width of about 30 fs and output energy of about 0.33 µJ per pulse can be focused on Ar to produce the 27th harmonic of the laser. When such an harmonic pulse is focused to an area of $(10 \, \mu m)^2$ intensities of $10^{13}$ W/cm$^2$ can be reached. Higher-harmonics can also be generated with similar or higher output energies.

Another example is the generation of the 45th harmonic in Xe or He, filtering it out of the HGS and focusing it into a jet of Kr together with an IR field that is sufficient to generate IR cut-off at the 19th harmonic or so. Kr has a spectral window between photon energies of 50 eV (the 31st harmonic) and 90 eV (the 57th harmonic). Therefore, shining a 45th-harmonic field on it generates new harmonics in this spectral window, without the necessity to increase the intensity of the IR field.

If desired, the intensity of the first light source can be reduced so as to decrease the cutoff frequency of the unmodified HGS. These embodiments allow the use of lower frequencies for the second optical field.

Reference is now made to FIG. 5 which is a schematic illustration of an imaging system 30 for imaging an object or a scene 32. System 30 comprises apparatus 10 (see FIG. 4) which is arranged to direct light 34 to object/scene 32, and an imager 36 configured for imaging the sample based on light 38 emitted thereby, reflected therefrom or transmitted therethrough. Light 34 can include the modified HGS emitted by substance 12. Alternatively, several harmonics of the modified HGS can be suppressed. For example, light 34 can include a single harmonic of the modified HGS. Control over the number of harmonics directed to object/scene 32 can be achieved via any technique known in the art. Additionally pulse shaping techniques can also be employed, if desired.

The term "imaging system," as used herein, refers to any system which captures an image of a sample or a scene. Such systems include camera systems, scanning system, holography system and the like.

When apparatus 10 provides HGS which extends into the X-ray range, system 30 can be a CT scanning system in which coherent X-rays are employed for performing the scan. This system can operate at a much lower power level than the sources of incoherent X-rays used in conventional CT systems, thus reducing the exposure of the subjects to ionizing radiation.

The development of masers and lasers circa 1960 stimulated speculation about the possibility to develop devices that generate coherent electromagnetic radiation with much shorter wavelengths, for example, of soft x-ray wavelengths between about 1 nm and about 10 nm. Such devices could be used in applications including holographic imagine of biological structures, plasma diagnostics and the generation of intense plasmas. More recent advances in other fields have suggested other applications of coherent soft x-rays. For example, a source of coherent x-rays for CT scanning could be operated at a much lower power level than the sources of incoherent x-rays now in use, reducing the exposure of the subjects to ionizing radiation.

Reference is now made to FIG. 6 which is a schematic illustration of spectroscopy system 40. System 40 comprises apparatus 10 (see FIG. 4) which is arranged to direct a light beam 44 to a sample 42, and a light detector 46 configured for detecting light 48 emitted by, reflected from or transmitted through sample 42. Light beam 44 can include the modified HGS emitted by substance 12. Alternatively, several harmonics of the modified HGS can be suppressed as further detailed hereinabove. Additionally pulse shaping techniques can also be employed, if desired.

Spectroscopy system 40 can be used for determining the concentration of analyte in a specimen. When the output 44 of apparatus 10 comprises is a multi-wavelength output, at least a few of the wavelengths can match distinguishing spectral characteristic features along at least a portion of a characteristic optical spectrum of the analyte under examination.

Reference is now made to FIG. 7 which is a schematic illustration of a lithography system 50 which comprises apparatus 10 (see FIG. 4) arranged to direct a light beam 54 to a substrate 52 to form patterns 56 thereon, and alignment mechanism 58 for aligning substrate 52 with light beam 54. Alignment mechanism 52 can comprise illumination means and/or viewing means (not shown) to allow measuring of the location of registration marks on substrate 52. Based on the measurement of the location of substrate 52, means are provided for calibrating the light beam 54 to the position of the substrate 52.

Light beam 54 can include the modified HGS emitted by substance 12. Alternatively, several harmonics of the modified HGS can be suppressed as further detailed hereinabove. Additionally pulse shaping techniques can also be employed, if desired.

Apparatus 10 can also be used in the field of micro-machining, for machining features in a submicron scale on a work piece, such as a substrate. Since Apparatus 10 is capable of producing photons in the UV and XUV range, it can be arranged to generate ultra-fast laser pulses (of less than 1 ps, more preferably less than one fs). The laser pulses can guided, e.g., via guiding optics, to a target area on the work piece for machining the feature thereon. An imaging system can be employed for imaging the target area to allow monitoring and control of the machining process.

The machining of features in a submicron scale can be utilized in various applications, including, without limitation, quantum electrical devices (such as, but not limited to, cellular automata, coupled quantum dots and resonant tunneling diodes) micro-optics (e.g., gray scale technology based devices), biotechnology (e.g., scanning tunneling microscope probe tips and various types of biochips), photonic crystals, communications, accelerometers, micro-circuitry and the like.

Apparatus 10 can also be used for other applications, including, without limitation, plasma diagnostics and the generation of intense plasmas. Apparatus 10 can also be used as an industrial cutting tool and for writing data on storage media, such as compact disks.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

This example demonstrates the ability of the method and apparatus of the present embodiments to provide HGS using a first strong optical filed and a second weak optical filed where the frequency of the second field is a harmonic of the frequency of the first field.

The momentum of an electron of an atom irradiated with an IR fundamental field of frequency $\omega$, and a harmonic XUV field of frequency $q\omega$ can be calculated by integrating the classical equation of motion with the initial condition that the electron is at rest immediately after ionization occurring at time $t_i$. For a linearly-polarized and sufficiently strong IR fundamental field having amplitude Er and polarization $e_k$ ($E_1(t)=e_k\epsilon_1^{in}\cos(\omega t)$), and a weak harmonic XUV field having amplitude $\epsilon_q^{in}$ ($\epsilon_w^{in}<<\epsilon_1^{in}$), the momentum of the electron of charge e and mass m is given by $p(t)=p_1(t)+p_q(t)$, where $$p_1(t) = \frac{e\varepsilon_1^{in}}{\omega}[\sin(\omega t) - \sin(\omega t_i)]$$

is the momentum due to the IR field alone, and $$p_q(t) = \frac{e\varepsilon_q^{in}}{q\omega}[\sin(\omega t) - \sin(\omega t_i)]$$

is the momentum due to the XUV field alone.

The kinetic energy with the two fields simultaneously present is $$E_k(t) = \frac{p^2(t)}{2m},$$

which can also be written as $$E_k(t) = \frac{p^2(t)}{2m} = E_{k,1}(t) + E_{k,q}(t) + \frac{p_1 \cdot p_q}{2m}, \text{ where}$$

$$E_{k,1}(t) = \frac{p_1^2(t)}{2m} \text{ and } E_{k,q}(t) = \frac{p_q^2(t)}{2m}.$$

Note that $E_{k,q}$ is proportional to $1/q^2$ and the cross term $p_1 \cdot p_q$ is proportional to $1/q$. Thus, for sufficiently large q, $E_k(t) \approx E_{k,1}(t)$. Note that for large enough q, $E_k(t) \approx E_{k,1}(t)$ even when $\epsilon_q^{in}$ is of the same order as $\epsilon_1^{in}$. Thus, the contribution of the harmonic XUV field to the kinetic energy is negligible. For this reason the relative phase between the two fields does not play a role in the HGS, which is indeed verified in both classical analysis and quantum mechanical simulations. In addition, assigning the electron a non-zero initial momentum to account for the photoelectric effect does not significantly increase its kinetic energy upon recombination.

A time-dependent Schrödinger equation (TDSE) simulation, such as the simulation shown in FIGS. 1a-b above, however, shows an enhancement of the cutoff harmonics and the harmonics q±2K (K being integer) upon addition of a weak XUV field to the strong IR field. Moreover, the HGS possesses certain symmetries: with respect to its center at harmonic q, the distribution of harmonics of the enhanced part of the spectrum (harmonics that have been produced only due to the addition of the XUV field), is symmetric with respect to q [e.g., for q=37, σ(33ω)≈σ(33ω), see FIG. 1b] and remains almost invariant upon variation of q. This suggests that despite the fact that the additional weak XUV field does not affect the electron trajectories, it does affect the recombination process. As will be shown hereinbelow, the XUV field induces periodic modulations to the remaining ground electronic state and the returning electronic wavepacket, with the same frequency as the XUV field. The returning modulated electronic wavepacket recombines with this modulated ground state to emit new harmonics.

In order to reveal the enhancement mechanism due to the inclusion of the weak XUV field, the present inventors studied the dynamics of a single active electron in an atom described by the field-free Hamiltonian $H_0(r)$ subjected to a long pulse of the IR field $E_1$ (1) in the length gauge and under the dipole approximation. The long pulse evolves the system adiabatically from the initial ground state of the field-free Hamiltonian $|\phi_1(r)>$ to a single resonance Floquet eigenstate $|\psi_1^{(0)}(r,t)\rangle$ of Eq. 1.1 which describes the entire dynamics of the system. A formalism of time independent perturbation theory is applicable since the time t may be treated as an additional coordinate. In the following, the parameters m,m', n,n',M,K denote integers ($\in Z$).

$$H_F^{(0)}(r,t)|\psi_{j,m}^{(0)}(r,t)\rangle = \varepsilon_{j,m}^{(0)}|\psi_{j,m}^{(0)}(r,t)\rangle \quad \text{(EQ. 1.1)}$$

where $$H_F^{(0)}(r,t) = H_0(r) - er \cdot E_1(t) - i\hbar\frac{\partial}{\partial t}$$

is the Floquet Hamiltonian. The indices (j, m) label the eigenstates j within any given Brillouin zone m, and r describes the internal degrees of freedom. The Floquet eigenfunctions of this operator satisfy the c-product inner product (written in the usual dirac notation) $\langle \psi_{j,m}^{(0)}(r,t)|\psi_{j',m'}^{(0)}(r,t)\rangle_{r,t} = \delta_{jj'}\delta_{mm'}$ and form a complete set. Floquet eigenfunctions which lie within the m-th Brillouin zone may be defined as $|\psi_{j,m}^{(0)}(r,t)\rangle \equiv |\psi_j^{(0)}(r,t)\rangle e^{i\omega mt}$ and $\langle \psi_{j,m}^{(0)}(r,t)| \equiv \langle \psi_j^{(0)}(r,t)|e^{-i\omega mt}$ with energies $\varepsilon_{j,m}^{(0)} \equiv \varepsilon_j^{(0)} + m\hbar\omega$. The ket and bra Floquet eigenfunctions are periodic with period $T=2\pi/\omega$ and can therefore be decomposed as a Fourier sum $|\psi_j^{(0)}(r,t)\rangle = \Sigma_n |\phi_{j,n}^{(0)}(r)\rangle e^{i\omega nt}$ and $\langle \psi_j^{(0)}(r,t)| = \Sigma \langle \phi_{j,n}^{(0)*}(r)|e^{-i\omega nt}$. Note that the Fourier components of the bra state are not complex-conjugated.

In order to calculate the HGS one may assume the Larmor approximation and analyze the time-dependent acceleration expectation value $$a_1^{(0)}(t) \equiv \frac{\partial^2}{\partial t^2} \langle \psi_1^{(0)}(r,t)|r|\psi_1^{(0)}(r,t)\rangle_r$$

which is proportional to the emitted field. The acceleration in energy space is given by the Fourier transform $$a_1^{(0)}(\Omega) = \frac{1}{T}\int_0^T dt\, a_1^{(0)}(t)e^{-i\Omega t}.$$

Exploring only frequencies which are integer multiples of ω [$\Omega=M\omega$, $M\in Z$], and using the property $$\frac{1}{T}\int_0^T dt\, e^{-i\omega nt} = \delta_{n,0},$$

the expression obtained is $a_1^{(0)}(M\omega) = -\omega^2 M^2 \Sigma_n \langle \phi_{1,n}^{(0)*}(r) |r|\phi_{1,n+M}^{(0)}(r)\rangle_r$. It can be shown to be non-vanishing only for integer odd values of M, which is a feature of monochromatic HHG.

With the addition of the weak XUV field $E_q$ (1), a new Floquet problem is obtained, which problem can be described by the Floquet Hamiltonian $H_F^{NEW}(r,t) \equiv H_F^{(0)}(r,t) + V(r,t)$, where the additional term $V(r,t) = -er \cdot E_q(t)$ can be treated as a perturbation. Time-independent 1st-order perturbation theory may be used to get an approximate solution for the Floquet Hamiltonian $H_F^{NEW}(r,t)$ as $$|\psi_1^{NEW}(r,t)\rangle = |\psi_1^{(0)}(r,t)\rangle + \sum_{(j',m')\neq(1,0)} c_1^{j',m'}(q)|\psi_{j'}^{(0)}(r,t)\rangle e^{i\omega m't} \quad \text{(EQ. 1.2)}$$

where the coefficients $c_1^{j',m'}(q)$ are given by $$c_1^{j',m'}(q) = -\frac{1}{2}e\varepsilon_q^{in}e_k \cdot \sum_n \frac{\langle \varphi_{j',n}^{(0)*}(r)|r|\varphi_{1,n+m'-q}^{(0)}(r)\rangle_r + \langle \varphi_{j',n}^{(0)*}(r)|r|\varphi_{1,n+m'-q}^{(0)}(r)\rangle_r}{\varepsilon_1^{(0)} - \varepsilon_{j'}^{(0)} - m'\hbar\omega} \quad \text{(EQ. 1.3)}$$

Using this solution, the time dependent acceleration expectation value $$a_1^{NEW}(t) \equiv \frac{\partial^2}{\partial t^2} \langle \psi_1^{NEW}(r,t)|r|\psi_1^{NEW}(r,t)\rangle_r$$

can be calculated. Keeping terms up to first order in $\epsilon_q^{in}$ the following expression for the acceleration in the frequency domain is obtained:

$$a_1^{NEW}(M\omega) = a_1^{(0)}(M\omega) - \omega^2 M^2 \sum_{(j',m')\neq(1,0)} \sum_n \quad \text{(EQ. 1.4)}$$

$$[c_1^{j',m'}(q)\langle \varphi_{1,n}^{(0)*}(r)|r|\varphi_{j',n-m'+M}^{(0)}(r)\rangle_r + c_1^{j',m'*}(q)\langle \varphi_{j',n-m'-M}^{(0)*}(r)|r|\varphi_{1,n}^{(0)}(r)\rangle_r]$$

This is the expression for the emitted HHG field. The HGS ($\sigma(M\omega) \equiv |a_1^{NEW}(M\omega)|^2$) has the same features as those presented in FIGS. 1a-b: the weak perturbative XUV field shifts the HGS beyond the cutoff obtained by the IR field alone. In the Floquet formalism presented here the origin of the HHG enhancement phenomena lies in the interferences between the ground and excited Floquet states. The HGS is modified due to the dipole cross-terms introduced by the weak XUV field.

The features in the HGS can also be explained in terms of the re-collision model. It was shown that the additional weak XUV field does not affect the electron trajectories because it does not modify the kinetic energy of the re-colliding electron. According to the findings of the numerical simulation it affects the recombination process. To see this the semiclassical re-collision model can be employed. In this model, the electronic wavefunction at the event of recombination is described as a sum of the following continuum and bound parts. Under the strong field approximation the returning continuum part in the direction of the polarization $e_k$ (which is taken along the x-direction for simplicity) is a superposition of plane waves $$\psi_c^\parallel(x,t) = \frac{1}{\sqrt{2\pi}} \int_{-\infty}^{\infty} dk \tilde{\psi}_c(k,t) e^{i[kx - \frac{E_k}{\hbar}t]}$$

where $k = k e_x$ ($k = |k|$) is the momentum of the electron, $$E_k \equiv \frac{\hbar^2 k^2}{2m}$$

is the usual dispersion relation and $\tilde{\psi}_c(k,t)$ are expansion coefficients which weakly depend on time. It is assumed that the continuum wavepacket $\psi_c(r,t)$ is separable in the x-coordinate and the 2 other lateral coordinates such that $\psi_c(r,t) = \psi_c^\parallel(x,t)\psi_c^\perp(y,z,t)$. It is assumed that the ground state is only slightly depleted during the tunnel-ionization and that due to the ac-Stark effect the electron adiabatically follows the instantaneous ground state of the potential which is periodically modified by the IR and XUV fields. Since the ac-Stark corrections to the instantaneous energy and wavefunction are small for normal field intensities, the instantaneous ground state can be approximated as $$\psi_b(r,t) \cong \phi_1(x + \varepsilon_1^{out}\cos(\omega t) + \varepsilon_q^{out}\cos(q\omega t), y, z) e^{+\frac{i}{\hbar}I_p t}$$

(where $I_p > 0$ and $\phi_1(r)$ are the field-free ground state eigenvalue and eigenstate, respectively). Note that $\psi_b(r,t)$ approximately describes the resonance Floquet state $|\psi_1^{NEW}(r,t)\rangle$. The quiver amplitudes $\varepsilon_1^{out}, \varepsilon_q^{out}$ of the spatial oscillations of the ground state are of the order of $$\varepsilon_q^{out} = \frac{\varepsilon_q^{in}}{q^2 \omega^2}, \text{ i.e.,}$$

a tiny fraction of a Bohr radius for normal laser intensities and/or large values of q. The bound part may therefore be expanded in a Taylor serie as $$\psi_b(r,t) \cong e^{+\frac{i}{\hbar}I_p t}\left\{\phi_1(r) + [\varepsilon_1^{out}\cos(\omega t) + \varepsilon_q^{out}\cos(q\omega t)]\frac{\partial}{\partial x}\phi_1(r)\right\}.$$

Note that the continuum wavefunction also undergoes the ac-Stark oscillations. This effect can be shown by selecting either the ground state or the continuum state for including the ac-Stark oscillations. In the present example, only the modification of the bound part was considered. Using the total wavefunction at the event of recombination $\psi(r,t) = \psi_b(r,t) + \psi_c(r,t)$, the time-dependent acceleration expectation value $$a(t) \equiv \frac{1}{m}\langle\Psi(r,t)| -\nabla V_0(r)|\Psi(r,t)\rangle_r$$

can be calculated, where $V_0(r)$ is the field-free potential. The dominant terms that are responsible for the emission of radiation at frequencies other than the incident frequencies $\omega$ and $q\omega$ are the bound-continuum terms $a(t) \cong 2\text{Re}\langle\psi_b(r,t)| -\nabla V_0(r) |\psi_c(r,t)\rangle_r$. It can be shown that the acceleration is composed of oscillating terms of the form $$a(t) \cong -2\text{Re}\frac{1}{\sqrt{2\pi}}\int_{-\infty}^{\infty} dk \begin{bmatrix} \tilde{\tilde{\psi}}_{IR}(k)e^{-\frac{i}{\hbar}[E_k+I_p]t} + \\ \tilde{\tilde{\psi}}_{XUV}(k)\varepsilon_1^{out}e^{-\frac{i}{\hbar}[E_k+I_p \pm \hbar\omega]t} + \\ \tilde{\tilde{\psi}}_{XUV}(k)\varepsilon_q^{out}e^{-\frac{i}{\hbar}[E_k+I_p \pm q\hbar\omega]t} \end{bmatrix} \quad (\text{EQ. 1.5})$$

Where:

$$\tilde{\tilde{\psi}}_{IR}(k) \equiv \frac{1}{m}\tilde{\psi}_c(k)\int_{-\infty}^{\infty} d^3r \phi_1(r) \nabla V_0(r) \psi_c^\perp(y,z,t) e^{ikx}, \quad (\text{EQ. 1.6})$$

$$\tilde{\tilde{\psi}}_{XUV}(k) \equiv \frac{1}{2m}\tilde{\psi}_c(k)\int_{-\infty}^{\infty} d^3r \frac{\partial \phi_1(r)}{\partial x} \nabla V_0(r) \psi_c^\perp(y,z,t) e^{ikx} \quad (\text{EQ. 1.7})$$

and the ± sign stands for summation over two-terms. The emitted field in a single re-collision event is composed of a continuum of these frequencies.

It is therefore demonstrated that despite of their small magnitude, the periodic time-dependent modulations to the ground electronic state induced by the XUV weak field of frequency $q\omega$ are responsible for the appearance of the new harmonics around q in the HGS via recombination with the returning electronic wavepacket. Each electron trajectory (plane wave) with kinetic energy $E_k$, recombines with the nucleus to emit, with equal probabilities, one of three possible photons with energies: $I_p + E_k$, $q\hbar\omega + I_p + E_k$ or $q\hbar\omega - (I_p + E_k)$. The HGS in the presence of the IR field alone $\hbar\Omega = I_p + E_k$ is now shifted by the energy of the XUV photon $\hbar q\omega$, and new harmonics are also formed, such that their distribution about the center q is symmetric. Also, with respect to the center q, the distribution of the XUV-formed harmonics, is invariant to a change in the energy of the XUV photon $\hbar q\omega$, since these harmonics originate from the same set of electron trajectories which are characteristic of the IR field alone.

When each single re-collision event is repeated every half cycle of the IR field, integer harmonics q±2K are obtained in the HGS. To see this, note that in two consecutive re-collision events at times $t_r$ and $t_r+T/2$ the following symmetry holds: $\tilde{\psi}(k,t_r+T/2) = \tilde{\psi}_c(-k,t_r)$. Consequently, since $V_0(r)$ and $\phi_1(r)$ are symmetric functions for atoms (and $$\frac{\partial \phi_1(r)}{\partial x}$$

is antisymmetric), the following symmetry holds $\overline{\tilde{\psi}}_{IR}(k,t_r+T/2) = -\overline{\tilde{\psi}}_{IR}(-k,t_r)$. The acceleration which results from the IR field therefore switches signs between subsequent re-collision events, which is the origin of the odd-selection rules. However, the behavior of the coefficients resulting from the addition of the XUV filed is different $\overline{\tilde{\psi}}_{XUV}(k,t_r+T/2) = +\overline{\tilde{\psi}}_{XUV}(-k,t_r)$. The acceleration which results from the additional XUV field does not switch signs between subsequent re-collision events and therefore yields even harmonics around q.

FIG. 8 shows a top view of the absolute square of the Gabor-transformed acceleration expectation value $$\left(\frac{1}{50T}\int_0^{50T} a(t)e^{-\frac{(t-t_0)^2}{\tau^2}}e^{-i\Omega t}, \quad \tau = 0.1T\right)$$

of the quantum mechanical simulation described in FIG. 1b for q=52, as function of $t_0$ and $\Omega$. Pink color (dark gray in grayscale) corresponds to high intensity, and yellow color (bright gray in grayscale) corresponds to low intensity.

In accordance with the classical re-collision model, different harmonics are emitted repeatedly every half cycle, with the IR cut-off harmonic (the 15th harmonic) emitted at times ~0.2T+0.5 nT. At those instants, also the 32nd and 74th harmonics, which are produced by the most energetic IR trajectory having absorbed XUV photon before re-collision, are emitted. In fact, the time-frequency distribution of the IR-generated harmonics, if shifted by the XUV harmonic order q or shifted and then inverted with respect to q, matches the distribution of the XUV-generated harmonics. Each electron trajectory, which with the IR field alone produces an harmonic $\Omega$, generates now, by absorption (and emission) of the XUV photon at the instant of re-collision, two duplicated new harmonics with energies $q\hbar\omega+\hbar\Omega$, $q\hbar\omega-\hbar\Omega$, and similar properties. For example, the harmonics of orders 38-48 and 56-66 have a "plateau" character (constant intensity), like the plateau harmonics 5-15.

In the present Example, it was demonstrated that the addition of a weak XUV harmonic field to a strong IR field leads to the extension of the cut-off in the HGS. The results of the quantum analytical expressions, quantum numerical simulations and classical arguments suggest that the enhancement is a single-atom phenomena. The seed XUV field modulates the ground state and affects the recombination process of all returning trajectories, and leads to the generation of new harmonics with structure well related to the HGS in the presence of the IR field alone.

Example 2

This example demonstrates the ability of the method and apparatus of the present embodiments to provide HGS using a first optical filed and a second optical filed, where the intensity of the second optical filed is not necessarily lower than the intensity of the first optical filed, and where the frequency of the second optical filed is not necessarily a harmonic of the frequency of the first optical filed.

As demonstrated above (see Example 1), the addition of a weak XUV field of harmonic frequency q$\omega$ to an IR driver field of frequency w, leads to the appearance of a new set of higher-order XUV harmonics q±2K (q and K being integers) which were absent in the spectra in the presence of the IR field alone. The XUV field was shown to induce periodic ac-Stark modulations with the same frequency as the XUV field to both participants in the recollision process: both the remaining ground electronic state and the returning electronic wavepacket. The returning modulated electronic wavepacket recombines with this modulated ground state to emit the new XUV harmonics. The enhancement of the IR HGS and the cutoff extension are a result of a single atom phenomenon.

In the present Example the effect of the ac-Stark modulations on the continuum part is neglected. The polarizability of the bound part an external field is a general phenomenon, which is not special to strong fields. It occurs also in the absence of any tunneling ionization and occurs also for small field intensities in the "linear-optics" regime, where it is responsible, despite of its tiny magnitude, for all linear optical phenomena (scattering, reflection, etc.).

In this example, the results obtained in Example 1 are generalized for the case in which the effect that an additional arbitrary XUV field, with arbitrary frequency $\tilde{q}\omega$ ($\tilde{q}$ not necessarily integer) and amplitude $\epsilon_{\tilde{q}}^{in}$ (not necessarily weak), has on the HGS. It will be demonstrated that as the amplitude of the XUV field is increased, higher sets of XUV harmonics $\tilde{q}\pm 2K$, $2\tilde{q}\pm(2K-1)$, $3\tilde{q}\pm 2K$, ... gradually appear, where each XUV harmonics set $$n\tilde{q} \pm [2K - 1 + \mathrm{mod}(n, 2)] \quad (n = 1, 2, 3, \ldots) \quad \text{is} \quad \left(\frac{\varepsilon_{\tilde{q}}^{in}}{\tilde{q}^2\omega^2}\right)^{2n}.$$

times weaker than the set of IR harmonics. For simplicity, the theoretical explanation of these features is based on the extension of the three-step model to include high-order perturbative terms. Yet, the (t,t')-Floquet method can also be employed.

Xe Atom Driven by Bichromatic Laser Field

As an illustrative numerical demonstration of the IR cut-off extension in the HGS due to the addition of an XUV field, a single electron 1D Xe atom irradiated by a sine-square pulse supporting N oscillations of linearly polarized light of bichromatic field is studied. The bichromatic field is composed of an IR laser field of frequency $\omega$ and amplitude $\epsilon_1^{in}$ and a high-frequency field of frequency $\tilde{q}\omega$ and amplitude $\epsilon_{\tilde{q}}^{in}$. The following TDSE was integrated using the split operator method:

$$i\hbar\frac{\partial}{\partial t}\Psi(x, t) = \begin{cases} \frac{p_x^2}{2m} + V_0(x) - ex\sin^2\left(\frac{\omega t}{2N}\right) \\ [\varepsilon_1^{in}\cos(\omega t) + \varepsilon_{\tilde{q}}^{in}\cos(\tilde{q}\omega t)]\end{cases}\Psi(x, t) \quad \text{(EQ. 2.1)}$$

between the times $$0 < t < NT \left(T = \frac{2\pi}{\omega}\right)$$

with atomic units ($\hbar$=m=−e=1) and with the wave function taken initially as the ground state $\phi_1(x)$ of the field-free model Hamiltonian of a 1D Xe atom, with the field-free effective potential $V_0(x)=-0.63\exp(-0.1424x^2)$. This potential supports three bound states, of which the two lowest ones mimic the two lowest electronic states of Xe, with energies $-I_p=-0.4451$ a.u. and $E_2=-0.1400$ a.u. The parameters used for the simulation were N=50, $\omega$=0.05695 a.u. ($\lambda$=800 nm), $\epsilon_1^{in}$=0.035 a.u. (corresponding to intensity of $$I_1^{in} \approx 4.299 \cdot 10^{13} \frac{W}{cm^2}\Bigr),$$

$$\varepsilon_{\tilde{q}}^{in} = 0.0001 \text{ a.u.} \quad (I_{\tilde{q}}^{in} \approx 3.509 \cdot 10^8 \text{ W/cm}^2).$$

In this type of simulation the Born approximation according to which the electromagnetic field is assumed to remain unchanged during the interaction with the electron is employed.

In order to calculate the HGS the Larmor approximation was assumed, and the time-dependent acceleration expectation value $$a(t) \equiv \frac{1}{m} \left\langle \Psi(x, t) \left| -\frac{dV_0(x)}{dx} \right| \Psi(x, t) \right\rangle + \quad \text{(EQ. 2.2)}$$

$$\frac{e}{m} \sin^2\left(\frac{\omega t}{2N}\right)[\varepsilon_1^{in} \cos(\omega t) + \varepsilon_{\tilde{q}}^{in} \cos(\tilde{q}\omega t)]$$

which is linearly proportional to the emitted field, was analyzed. The power spectra (HGS) of emitted radiation by the oscillating electron is proportional to the modulus-square of the Fourier-transformed time-dependent acceleration expectation value:

$$\sigma(\Omega) = \frac{2e^2}{3c^3} |a(\Omega)|^2 \quad \text{(EQ. 2.3)}$$

where the acceleration in frequency space is given by the Fourier transform $$a(\Omega) = \frac{1}{NT} \int_0^{NT} a(t) e^{-i\Omega t} dt \quad \text{(EQ. 2.4)}$$

Figure 9:
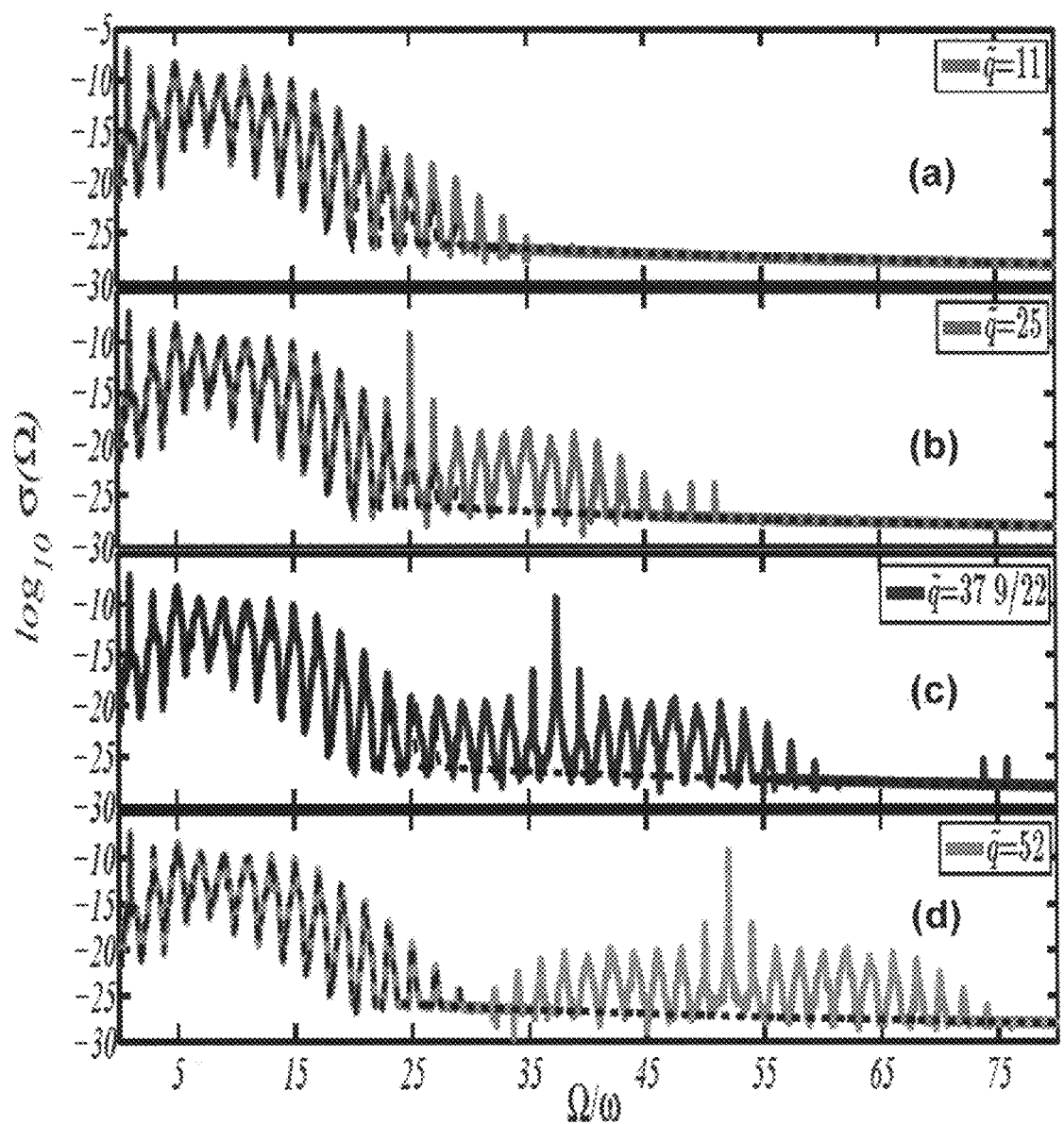

FIGS. 9a-d show the HGS for different values of $$\tilde{q} (\tilde{q} = 11, \tilde{q} = 25, \tilde{q} = 37\frac{9}{22}$$

and $\tilde{q}=52$, respectively). The HGS in the presence of the IR field alone is also shown for comparison. As shown in FIGS. 9a-d the position of the unmodified HGS cut-off is at the 15th harmonic, where the maximal harmonic of the HGS is the 29th harmonic. As shown in FIG. 9a, when the high frequency field has a frequency which is still within the unmodified HGS ($\tilde{q}=11$ in the present example), its only influence on the HGS is to modify the IR-harmonics. As shown in FIG. 9b, when the high frequency field has a frequency close to the IR cut-off ($\tilde{q}=25$ in the present example, corresponding to an XUV radiation of wavelength 16 nm), the IR-harmonics are modified, and new harmonics (above the 29th harmonic), which were not present with the IR field alone, appear. The new harmonics appear due to the addition of the XUV field only, and are referred to as XUV-harmonics. The spectrum of XUV-harmonics is referred to hereinunder as XUV-HGS.

Comparing FIGS. 9b, 9c and 9d one sees that the position of the maximal XUV harmonic increases as the XUV frequency increases, and that the XUV harmonics appear around the frequency of the XUV field. It was found by the present inventor that the number of new XUV harmonics reaches is particularly large, presumably maximal, when the value of $\tilde{q}$ is not odd integer or when $\tilde{q}$ is greater than approximately twice the number of the maximal harmonic of the unmodified HGS (see, e.g., FIG. 9d).

Generally, upon the addition of an XUV field of frequency $\tilde{q}\omega$ to an IR field of frequency $\omega$, the harmonics $\tilde{q}\pm 2K$ (K being integer) are either modified (if they were already present to some extent in the unmodified HGS) and/or appear as new XUV harmonics. Similarly to the situation discussed in Example 1 above, the modified HGS possesses certain symmetries: with respect to its center at harmonic $\tilde{q}$, the distribution of the XUV harmonics is symmetric (e.g., for $$\tilde{q} = 37\frac{9}{22},$$

$$\sigma\left(33\frac{9}{22}\omega\right) \approx \sigma\left(41\frac{9}{22}\omega\right),$$

etc.) and upon variation of $\tilde{q}$ the distribution is shifted but remains substantially invariant. The structure of the XUV-HGS consists, in principal, of two new plateau-like regions and two new cut-off-like regions. For example, for $\tilde{q}=52$ (see FIG. 9d), the harmonics of order 38-48 and 56-66 have a "plateau" character (approximately constant intensity), and the harmonics 32-36 and 68-72 have a "cut-off" character (approximately constant phase). The XUV harmonics are about 10-orders of magnitude weaker than the harmonics of the unmodified HGS.

FIGS. 10a-b show the obtained modified HGS's for a larger intensity of the second optical field, $\epsilon_{\tilde{q}}^{in}=0.0035$ a.u. ($I_{\tilde{q}}^{in}\approx 4.299\cdot 10^{11}$ W/cm$^2$), where all other parameters are kept the same. FIGS. 10a-b show two values of $\tilde{q}$:

$$\tilde{q} = 37\frac{9}{22}$$

and $\tilde{q}=52$. Similarly to the previous case (weak XUV field, see FIG. 9c-d) the set of new XUV harmonics $\tilde{q}\pm 2K$ appears around 4. It is 7-orders of magnitude weaker than the harmonics of the unmodified HGS. In addition, an additional set of new XUV harmonics $2\tilde{q}\pm(2K-1)$ appears around $2\tilde{q}$. This set possesses the aforementioned symmetries: it consists of two new plateau-like regions and two cut-off-like regions. The intensity of the XUV harmonics around $2\tilde{q}$ are is lower: about 14-orders of magnitude weaker than the harmonics of the unmodified HGS. A third set of XUV harmonics $3\tilde{q}\pm 2K$ appears around 3. $\tilde{q}$. This set also possesses the aforementioned symmetries and is about 21-orders of magnitude weaker than the harmonics of the unmodified HGS.

The above description holds also for a larger intensity of the second optical field. Specifically, larger intensities allows generation of new sets of XUV harmonics around $4\tilde{q}\pm(2K-1)$, $5\tilde{q}\pm 2K$, etc., which are well distinguished by the large differences in their intensities.

FIG. 11 shows a top view of HGS spectra of the quantum mechanical simulation described above in relation to FIGS. 9a-d ($I_{\tilde{q}}^{in}\approx 3.509\cdot 10^8$ W/cm$^2$), as a function of $\tilde{q}$ and $\Omega/\omega$. The HGS's shown in FIGS. 9a-d above were obtained by taking cuts of the HGS shown in FIG. 11 along specific values of $\tilde{q}$. In FIG. 11, red color corresponds to high intensity, and blue color corresponds to low intensity.

The lines with different slopes in the spectrum shown in FIG. 11 are a manifestation of the following selection rules for the emitted harmonics: $\Omega/\omega=n_1+n_{\tilde{q}}\tilde{q}$, where $n_1+n_{\tilde{q}}=2K-1$ ($n_1$ and $n_{\tilde{q}}$ being integers). Groups of harmonics corresponding to absorption of more than one XUV photon are absent, due to the weak intensity of the XUV field. That is, the only set of XUV harmonics that appear is the set $\tilde{q}\pm 2K$.

FIG. 12 shows a top view of HGS spectra of the quantum mechanical simulation described above in relation to FIGS. 10a-b $I_{\tilde{q}}^{in}\approx 4.299\cdot 10^{11}$ W/cm$^2$, as a function of $\tilde{q}$ and $\Omega/\omega$. The HGS's shown in FIGS. 10a-b above were obtained by taking cuts of the HGS shown in FIG. 12 along specific values of $\tilde{q}$. The color/grayscale definitions and the selection rules shown in FIG. 12 are the same as those described for FIG. 11. As shown, in FIG. 12, the higher intensity of the second optical field results in the generation of the XUV harmonics sets $2\tilde{q}\pm(2K-1)$ and $3\tilde{q}\pm2K$.

The results depicted in FIGS. 11 and 12 suggest that the new sets of XUV harmonics emerge from the single set of harmonics in the unmodified HGS. The aforementioned selection rules for the emitted harmonics can be equivalently written as:

$$\tilde{q} = \frac{1}{n_{\tilde{q}}}\frac{\Omega}{\omega} - \frac{n_1}{n_{\tilde{q}}} \qquad (EQ. 2.5)$$

The sets of lines in the spectra are characterized hereinafter by the tufle $(n_1, n_{\tilde{q}})$ according to the values of the corresponding integers $n_1$ and $n_{\tilde{q}}$. The set of lines parallel to the vertical axis of FIG. 11 (infinite slope) correspond to $n_{\tilde{q}}=0$ and odd values of $n_1$. These line describe the harmonics $\Omega=(2K-1)\omega$ of the unmodified HGS (in a perturbative picture, this corresponds to no absorption of $\tilde{q}\omega$ photons, only an odd number of $\omega$ photons) and will be denoted $(n_1,n_{\tilde{q}})=(2K-1,0)$. In the absence of the XUV field, only this set would appear in a top view of an HGS spectrum. The set of lines with slope equal to unity correspond to $(n_1, n_{\tilde{q}})=(2K,1)$. These lines describe the XUV harmonics $\Omega=(\tilde{q}\pm2K)\omega$ that are also shown in FIGS. 9a-d. As shown, these lines are much weaker than the lines corresponding to the set $(n_1,n_{\tilde{q}})=(2K-1,0)$.

The strongest line in the set $n_{\tilde{q}}=1$ corresponds to $(n_1,n_{\tilde{q}})=(0,1)$ describing absorption of one $\tilde{q}\omega$ photon and no $\omega$ photons. This line, together with the lines to its right $[(n_1,n_{\tilde{q}})=(2,1), (4,1), \ldots]$ emerge from the same points on the function $\tilde{q}=1$ where the IR harmonic lines emerge. The lines $(n_1,n_{\tilde{q}})=(-2,1), (-4,1), \ldots$ are a mirror image of the lines $(n_1,n_{\tilde{q}})=(2,1), (4,1), \ldots$, with respect to the central line $(n_1,n_{\tilde{q}})=(0,1)$. This suggests that the symmetry properties of the XUV-HGS manifest the origination of the XUV harmonics from the same electronic trajectories that produce harmonics of the unmodified HGS.

When the intensity of the high-frequency field is increased (FIG. 12), the sets $(n_1,n_{\tilde{q}})=(2K-1,2)$ and $(n_1,n_{\tilde{q}})=(2K,3)$ appear. These sets are 20- and 30-orders of magnitudes smaller than the harmonics of the unmodified HGS, respectively. These XUV harmonics also originate from the electronic trajectories that produce the harmonics of the unmodified HGS.

Re-Collision Description of Bichromatic Laser Field

The process HHG driven by an IR filed only, can be formulated as follows. The electronic wavefunction at the event of recombination $\psi(r,t\approx t_r)$ can be written as a sum of the following continuum part $\psi_c$ and bound part $\psi_b$:

$$\Psi(r,t_r) = \psi_b(r,t_r) + \psi_c(r,t_r). \qquad (EQ. 2.6)$$

It is assumed that the strong IR field ionizes the electron by tunneling from the initial ground state $\phi_1(r)$ of the field-free Hamiltonian, which is only slightly depleted during this process. It is also assumed that the electronic wavefunction which remains bound, evolves solely under the field-free Hamiltonian only, i.e., only accumulates a trivial phase:

$$\psi_b(r, t) = \phi_1(r)e^{\frac{i}{\hbar}I_p t} \qquad (EQ. 2.7)$$

where $-I_p$ is the energy of the ground state. Under the strong field approximation, the freed electronic continuum part evolves under the external field only. Taking the direction of linear polarization $e_k$ along the x-direction for simplicity, and assuming separability of the continuum wavefunction $\psi_c(r, t\approx t_r)$ along the x-coordinate and the 2 other lateral coordinates, the continuum wavefunction can be written as $$\psi_c(r,t\approx t_r) = \psi_c^{\parallel}(x,t\approx t_r)\psi_c^{\perp}(y,z,t\approx t_r) \qquad (EQ. 2.8)$$

where the returning continuum part in the direction of polarization is some superposition of plane waves $$\psi_c^{\parallel}(x, t_r) = \frac{1}{\sqrt{2\pi}}\int_{-\infty}^{\infty}dk\tilde{\psi}_c^{\parallel}(k, t_r)e^{i\left[kx - \frac{E_k}{\hbar}t_r\right]} \qquad (EQ. 2.9)$$

and where $k=ke_x$ ($k=|k|$) is the momentum of the electron, $$E_k \equiv \frac{\hbar^2 k^2}{2m}$$

is the usual dispersion relation and $\tilde{\psi}_c^{\parallel}(k,t_r)$ are expansion coefficients which weakly depend on time.

The time-dependent acceleration expectation value can be calculated using the total wavefunction at the event of recombination $\psi(r,t\approx t_r)$. Keeping only the part which is responsible for the emission of radiation at frequencies other than the incident frequency $\omega$, the acceleration reads $$a(t) \equiv \frac{1}{m}\langle\Psi(r, t)|-\nabla V_0(r)|\Psi(r, t)\rangle_r,$$

where $V_0(r)$ is the field-free potential. Assuming low depletion rate of the ground state (and hence, small population of the continuum wavepacket), the dominant terms that are responsible for the emission of radiation at frequencies other than the incident frequency $\omega$ are the bound-continuum terms. This is because the bound-bound term $\langle\psi_b(r,t)|-\nabla V_0(r)|\psi_b(r,t)\rangle_r$ is time-independent and does not radiate and the contribution of the continuum-continuum term is negligible. Thus, $$a(t_r) = \frac{2}{m}\text{Re}\langle\psi_b(r, t_r)|-\nabla V_0(r)|\psi_c(r, t_r)\rangle_r \qquad (EQ. 2.10)$$

Substituting the expressions for the continuum part $\psi_c$ and bound part $\psi_b$ into the expression for acceleration one fined that the acceleration is composed of oscillating terms of the form:

$$a(t_r) = \text{Re}\int_{-\infty}^{\infty}dk\tilde{\psi}^{(0)}(k, t_r)e^{-\frac{i}{\hbar}\left[I_p + \frac{\hbar^2 k^2}{2m}\right]t_r} \qquad (EQ. 2.11)$$

where $$\tilde{\psi}^{(0)}(k, t_r) \equiv \qquad (EQ. 2.12)$$

$$-\frac{2}{m}\frac{1}{\sqrt{2\pi}}\tilde{\psi}_c^{\parallel}(k, t_r)\int_{-\infty}^{\infty}d^3 r\phi_1(r)\nabla V_0(r)\psi_c^{\perp}(y, z, t_r)e^{ikx}.$$

The emitted HHG field in a single re-collision event at $t \approx t_r$ is a burst of light which corresponds to the spectral continuum $I_p \hbar \Omega < I_p + 3.17 U_p$ where $$3.17 U_p \equiv 3.17 \frac{e^2 (\varepsilon_1^{in})^2}{4m\omega^2} \quad \quad (5)$$

is the value of the most energetic returning electron trajectory. In addition, since the IR field pulls the electron along the x-direction, a symmetric evolution of the continuum wavefunction in the lateral plane is assumed: $\psi_c^{\{fourth\ root\}}(y,z,t_r) = \psi_c^{\{fourth\ root\}}(-y,-z,t_r)$. Since for atoms $V_o(r)$ and $\phi_1(r)$ are symmetric functions (and $\nabla V_0(r)$ is antisymmetric), the coefficient $\overline{\psi}^{(0)}(k,t_r)$ has a nonzero component only along the x-direction. Thus, the acceleration $a(t_r)$ points along the x-direction.

When each single re-collision event is repeated every half cycle of the IR field, integer odd harmonics 2K−1 are obtained in the HGS. To see this one compares two consecutive re-collision events at times $t_r$ and $$t_r + \frac{T}{2}.$$

Suppose that $\psi_c^{\|}(x,t_r)$ was born at some initial time $t_i$ from $\phi_1(r)$.

$$\psi_c^{\|}\left(x, t_r + \frac{T}{2}\right)$$

was born T/2 after $\psi_c^{\|}(x,t_r)$ at the time $$t_i + \frac{T}{2},$$

and was therefore born from $$\phi_1(r) e^{\frac{i}{\hbar} I_p \frac{T}{2}}$$

since the bound state from which the continuum state tunnels out, has accumulated this phase. In addition, the two continuum functions $\psi_c^{\|}(x,t_r)$ and $$\psi_c^{\|}\left(x, t_r + \frac{T}{2}\right)$$

are released in opposite spatial directions, because the IR field changes direction in two subsequent tunneling times. Therefore, the symmetry relation between $\psi_c^{\|}(x,t_r)$ and $$\psi_c^{\|}\left(x, t_r + \frac{T}{2}\right)$$

is:

$$\psi_c^{\|}(x, t_r) = \psi_c^{\|}\left(-x, t_r + \frac{T}{2}\right) e^{-\frac{i}{\hbar} I_p \frac{T}{2}} \quad \quad (EQ.\ 2.13)$$

Using this symmetry, and the property $$E_k = \frac{\hbar^2 k^2}{2m} = E_{-k},$$

one obtains the following expression for $\psi_c^{\|}(k,t_r)$:

$$\tilde{\psi}_c^{\|}(k, t_r) = \tilde{\psi}_c^{\|}(-k, t_r + T/2) e^{-\frac{i}{\hbar}(I_p + E_k)\frac{T}{2}} \quad \quad (EQ.\ 2.14)$$

Using the relations $V_0(r)=V_0(-r)$, $\phi_1(r)=\phi_1(-r)$, $\nabla V_0(r)=-\nabla V_0(-r)$ and $\psi_c^{\perp}(y,z,t_r)=\psi_c^{\perp}(y,z,t_r+T/2)=\psi_c^{\perp}(-y,-z,t_r)$, the following symmetry is obtained for $\overline{\psi}^{(0)}(k,t_r)$:

$$\tilde{\overline{\psi}}^{(0)}(k, t_r) = -\tilde{\overline{\psi}}^{(0)}(-k, t_r + T/2) e^{-\frac{i}{\hbar}(I_p + E_k)\frac{T}{2}}. \quad \quad (EQ.\ 2.15)$$

Using this symmetry one finds that the acceleration satisfies:

$$a(t_r + T/2) = -a(t_r) \quad \quad (EQ.\ 2.16)$$

The acceleration vector is periodic in T and exhibits alternating directions between subsequent re-collision events. Thus, its only nonzero components in its Fourier expansion correspond to odd integer harmonics of $\omega$. The acceleration which is responsible for the emission of odd harmonics is denoted hereinafter by $a^{(O)}(t)$.

The three-step model described above assumes that the only time evolution of the remaining bound part of the electronic wavefunction is to accumulate a trivial phase. This assumption, however, describes only the leading term in the time evolution of the bound part. In reality, due to the ac-Stark effect induced by the IR field, the electron adiabatically follows the instantaneous ground state of the potential which periodically shakes back and forth by the IR field. If one carries out a TDSE simulation and looks at the electronic wavefunction in the field-free potential region during the action of the IR field, one sees that it oscillates back and forth with the same frequency of the IR field. The time evolution of the bound part $\psi_b(r,t)$ is therefore corrected in accordance with preferred embodiments of the present invention from the trivial evolution provided above. Additionally, for common field intensities, the ac-Stark correction to the instantaneous ground state energy is negligible, and an approximately constant instantaneous ground-state energy ($I_p$) is therefore assumed. The ac-Stark effect induces a periodic motion of the wavefunction as a whole, without deforming it. Thus, the instantaneous ground state wavefunction is approximated as:

$$\psi_b(r, t) \cong \phi_1(x + \varepsilon_1^{out} \cos(\omega t), y, z) e^{+\frac{i}{\hbar} I_p t} \quad \quad (EQ.\ 2.17)$$

A simple time-dependence in $\psi_b(r,t)$ that gives periodic modulations at frequency $\omega$ has been assumed. It is noted that in the language of non-Hermitian quantum mechanics such expression approximately describes the resonance Floquet state which evolves from the ground state $\phi_1(r)$ upon the switching of the IR field.

The quiver amplitude $\epsilon_1^{out}$ of the spatial oscillations of the ground state is of the order of $$\varepsilon_1^{out} = \frac{\varepsilon_1^{in}}{(E_2 + I_p)^2 - \omega^2}$$

which is approximately the quiver amplitude of a an electron bound in a short-range potential of the type used here, driven by an IR field of amplitude $\epsilon_1^{in}$. This amplitude is a small fraction of a Bohr radius, provided that the laser's frequency does not match some level transition. The bound part may therefore be expanded in a Taylor series as:

$$\psi_b(r,t) \cong e^{-\frac{i}{\hbar}I_p t}\left\{\phi_1(r) + \varepsilon_1^{out}\cos(\omega t)\frac{\partial}{\partial x}\phi_1(r)\right\} \quad \text{(EQ. 2.18)}$$

Calculation of the time-dependent acceleration expectation value using the total wavefunction at the event of recombination $\psi(r,t \approx t_r)$ with the modified bound part $\psi_b(r,t_r)$ given by the above Taylor expansion, while keeping again only the terms that are responsible for the emission of radiation at frequencies other than the incident frequency $\omega$ (the bound-continuum terms), yields:

$$a(t_r) = a^{(0)}(t_r) + \varepsilon_1^{out}\cos(\omega t_r)a^{(1)}(t_r), \quad \text{(EQ. 2.19)}$$

where $$a^{(1)}(t_r) = \text{Re}\int_{-\infty}^{\infty}dk\tilde{\psi}^{(1)}(k,t_r)e^{-\frac{i}{\hbar}\left[I_p + \frac{\hbar^2 k^2}{2m}\right]t_r}, \quad \text{(EQ. 2.20)}$$

and where $$\tilde{\psi}^{(1)}(k,t_r) \equiv \quad \text{(EQ. 2.21)}$$
$$-\frac{2}{m}\frac{1}{\sqrt{2\pi}}\tilde{\psi}_c^{\parallel}(k,t_r)\int_{-\infty}^{\infty}d^3r\frac{\partial\phi_1(r)}{\partial x}\nabla V_0(r)\psi_c^{\perp}(y,z,t_r)e^{ikx}.$$

It was therefore demonstrated that the inclusion of the Stark effect contributes a new term $\epsilon_1^{out}\cos(\omega t_r)a^{(1)}(t_r)$ to the acceleration. In a single re-collision event at $t \approx t_r$, this term produces two bursts of light. One corresponds to the spectral continuum $I_p + \hbar\omega < \hbar\Omega < I_p + 3.17U_p + \hbar\omega$ and the other to $I_p - \hbar\omega < \hbar\Omega < I_p + 3.17U_p - \hbar\omega$. These bursts of light are weaker than the burst resulting from $a^{(0)}(t_r)$ since the factor $$\varepsilon_1^{out} = \frac{\varepsilon_1^{in}}{(E_2 + I_p)^2 - \omega^2}$$

is typically small.

Generally, each electron trajectory (plane wave) with kinetic energy $E_k$, recombines with the nucleus to emit radiation of energy $I_p + E_k$, and two "duplicate" photons with energies $I_p + E_k - \hbar\omega$ and $I_p + E_k + \hbar\omega$, at the same emission times. In a multi recollision sequence, only some of these photons appear in the HGS, as dictated by selection rules described below. In addition, since the functions $$\frac{\partial\phi_{1(r)}}{\partial x}$$

and $\psi_c^{\perp}(y,z,t_r)$ are symmetric with respect to y, z and $\nabla V_0(r) = -\nabla V_0(-r)$, the coefficient $\overline{\psi}^{(1)}(k,t_r)$ and the acceleration $a^1(t_r)$ point along the x-direction.

When each single re-collision event is repeated every half cycle of the IR field, the new term in the acceleration contributes integer odd harmonics 2K−1 to the HGS. To see this one can compare two consecutive re-collision events at times $t_r$ and $$t_r + \frac{T}{2}$$

and note that the symmetry relation between $\psi_c^{\parallel}(x,t_r)$ and $$\psi_c^{\parallel}\left(x, t_r + \frac{T}{2}\right)$$

and the symmetry relation between $\tilde{\psi}_c^{\parallel}(k,t_r)$ and $$\tilde{\psi}_c^{\parallel}\left(k, t_r + \frac{T}{2}\right)$$

still hold since the modification of the bound part of the electronic wavefunction has no influence on the continuum part.

Since $$\frac{\partial\phi_1(r)}{\partial x}$$

and $\nabla V_0(r)$ are antisymmetric with respect to inversion of x, the following symmetry is obtained for $\tilde{\psi}_c^{(1)}(k,t_r)$:

$$\tilde{\psi}^{(1)}(k,t_r) = +\tilde{\psi}^{(1)}(-k, t_r + T/2)e^{-\frac{i}{\hbar}(I_p + E_k)\frac{T}{2}}. \quad \text{(EQ 2.22)}$$

Using this symmetry one finds that $a^{(1)}$ satisfies:

$$a^{(1)}(t_r + T/2) = +a^{(1)}(t_r) \quad \text{(EQ. 2.23)}$$

The acceleration vector is therefore periodic in T/2. Its only nonzero components in its Fourier expansion correspond to even integer harmonics of $\omega$. The term which is responsible for the emission, $\epsilon_1^{out}\cos(\psi t_r)a^{(1)}(t_r)$, however, switches signs every T/2, thus giving rise to odd harmonics in the HGS $$\left(\cos\alpha\cos\beta = \frac{1}{2}[\cos(\alpha - \beta) + \cos(\alpha + \beta)]\right).$$

That is, the radiation resulting from the ac-Stark oscillations of the bound electron is composed of odd integer harmonics of $\omega$, like the radiation which results from $a^{(0)}$. The two fields, emitted by $a^{(0)}$ and $\epsilon_1^{out}\cos(\psi t_r)a^{(1)}$, generally interfere with each other. Yet, since the field resulting from $a^{(1)}$ is weaker it is masked by the field produced from $a^{(0)}$.

The effect of the ac-Stark oscillations on the HGS can be summarized as follows: in a single re-collision event each electron trajectory (plane wave) with kinetic energy $E_k$, recombines with the nucleus to emit, at the same emission time, radiation at energy $I_p+E_k$, and two weaker "duplicate" electromagnetic waves with energies $I_p+E_k-\hbar\omega$ and $I_p+E_k+\hbar\omega$ due to the ac-Stark effect. In a multi re-collision sequence, due to the symmetry properties discussed above, only odd-harmonic photons appear in the HGS.

The contribution to each plateau odd harmonic $\Omega$ in the HGS comes, in principle, from six emission times: the a first emission time corresponds to the recombination of the short trajectory with kinetic energy $\hbar\Omega-I_p$, a second emission time corresponds to the "duplicate" recombination resulting from a different short trajectory, with kinetic energy $\hbar\Omega-I_p$ (the ac-Stark oscillations of the ground state at frequency $\omega$ makes the final energy of the emitted photon $\hbar\Omega-\hbar\omega-I_p+\hbar\omega=\hbar\Omega-I_p$), a third emission time corresponds to the "duplicate" recombination resulting from a different short trajectory, with kinetic energy $\hbar\Omega+\hbar\omega-I_p$, and three additional emission times result from three long trajectories in the same manner. Due to the large differences in intensities, only the two emission times, those attributed to the short and long trajectories at kinetic energy $\hbar\Omega-I_p$, contribute.

The effect of the ac-Stark oscillations on the HGS in this example is not large, since the harmonics produced by this mechanism are generally masked. Yet, high enough frequency of the ac-Stark oscillations, well above the IR cut-off, cause the appearance of high energy photons which were not present in the unmodified HGS. In this case, the lack of contribution of the ordinary re-collision mechanism (neglecting the ac-Stark effect) to the appearance of these new high-energy photons substantially enhances the weight of the ac-Stark effect.

The way to induce ac-Stark oscillation of high frequency according to various exemplary embodiments of the present invention is by applying a second high-frequency XUV field, in addition to the IR field. The frequency of the second field is preferably above the cutoff frequency of the unmodified HGS.

Suppose then that the atom is irradiated with an IR field of frequency a) and an XUV field of frequency $\tilde{q}\omega$. As discussed above, for sufficiently large $\tilde{q}$, the XUV field mainly influences the recombination process. This field induces ac-Stark oscillation in the exact same way as the IR field did. Thus the approximations used before are still applicable and the instantaneous ground state wavefunction is approximated as:

$$\psi_b(r,t) \cong \phi_1(x+\varepsilon_1^{out}\cos(\omega t)+\varepsilon_{\tilde{q}}^{out}\cos(\tilde{q}\omega t), y, z)e^{+\frac{i}{\hbar}I_p t} \quad \text{(EQ 2.24)}$$

The quiver amplitude $\varepsilon_{\tilde{q}}^{out}$ of the spatial oscillations of the ground state is even smaller than $\varepsilon_1^{out}$ because of the high frequency of the XUV field $$\varepsilon_{\tilde{q}}^{out} = \frac{\varepsilon_{\tilde{q}}^{in}}{(E_2+I_p)^2-\tilde{q}^2\omega^2} \approx \frac{\varepsilon_{\tilde{q}}^{in}}{\tilde{q}^2\omega^2}.$$

The bound part may be expanded in a Taylor series:

$$\psi_b(r,t) \cong e^{+\frac{i}{\hbar}I_p t}\{\phi_1(r)+[\varepsilon_1^{out}\cos(\omega t)+\varepsilon_{\tilde{q}}^{out}\cos(\tilde{q}\omega t)]\frac{\partial}{\partial x}\phi_1(r)\}. \quad \text{(EQ 2.25)}$$

Using this expression for the modified bound part $\psi_b(r,t_r)$ the time-dependent acceleration expectation value can be calculated using the total wavefunction at the event of recombination $\psi(r,t\approx t_r)$. Keeping again only the bound-continuum terms, one obtains:

$$a(t_r)=a^{(0)}(t_r)+[\varepsilon_1^{out}\cos(\omega t_r)+\varepsilon_{\tilde{q}}^{out}\cos(\tilde{q}\omega t_r)]a^{(1)}(t_r). \quad \text{(EQ 2.26)}$$

The ac-Stark effect at the frequency of the XUV field contributes a new term $\varepsilon_{\tilde{q}}^{out}\cos(\tilde{q}\omega t_r)a^{(1)}(t_r)$ to the acceleration. In a single re-collision event at $t\approx t_r$ this additional term produces two bursts of light. One corresponds to the spectral continuum $I_p+\tilde{q}\hbar\omega<\hbar\Omega<I_p+3.17U_p+\tilde{q}\hbar\omega$ and the other to $I_p-\tilde{q}\hbar\omega<\hbar\Omega<I_p+3.17U_p-\tilde{q}\hbar\omega$ which, in case that the XUV field is well above the IR cut-off, can be written as $\tilde{q}\hbar\omega-I_p<\hbar\Omega<\tilde{q}\hbar\omega-I_p-3.17U_p$. These bursts of light are weaker than the burst resulting from $a^{(0)}(t_r)$. Nevertheless they have a significant impact on the HGS since they are a major source of new XUV harmonics which appear in the modified HGS.

Each electron trajectory (plane wave) with kinetic energy $E_k$, recombines with the nucleus to emit, at the same emission time, radiation at energy $I_p+E_k$, and two "duplicate" photons with energies $\tilde{q}\hbar\omega-I_p-E_k$ and $I_p+E_k+\tilde{q}\hbar\omega$.

When each single re-collision event is repeated every half cycle of the IR field, the new term in the acceleration contributes to the HGS integer even harmonics around $\tilde{q}$: $\tilde{q}\pm 2K$. To see this one compares two consecutive re-collision events at times $t_r$ and $t_r+T/2$ and note that the symmetry $a^{(1)}(t_r+T/2)=+a^{(1)}(t_r)$ still holds. The acceleration vector $a^{(1)}(t_r)$ is periodic in $T/2$ hence contributes even integer harmonics of $\omega$. The term which is responsible for the emission, $\varepsilon_{\tilde{q}}^{out}\cos(\tilde{q}\omega t_r)a^{(1)}(t_r)$ therefore gives rise to the appearance of the harmonics $\Omega=(\tilde{q}\pm 2K)\omega$ in the HGS. That is, the radiation resulting from the ac-Stark oscillations of the bound electron is composed of even integer harmonics of $\omega$ around the harmonic $\tilde{q}$. This field is weaker than the harmonics produced by $a^{(0)}(t_r)$. When $\tilde{q}$ is an odd integer, the term $\varepsilon_{\tilde{q}}^{out}\cos(\tilde{q}\omega t_r)a^{(1)}(t_r)$ produces odd harmonics, which are partially or completely masked by the IR harmonics produced from $a^{(0)}(t_r)$ if $\tilde{q}$ is not above the cut-off harmonic of the unmodified HGS. However, when $\tilde{q}$ is above the cut-off harmonic or is not an odd integer, new XUV harmonics, not present in the unmodified HGS appear. These harmonics will be $$|\varepsilon_{\tilde{q}}^{out}|^2 \approx \left(\frac{\varepsilon_{\tilde{q}}^{in}}{\tilde{q}^2\omega^2}\right)^2$$

times weaker than the harmonics of the unmodified 5 HGS, and are therefore distinguishable therefrom by their intensity.

Since these harmonics are originated by the same electronic trajectories which produce the harmonics of the unmodified HGS, their emission times are correlated therewith. In a single re-collision event each electron trajectory (plane wave) with kinetic energy $E_k$, recombines with the nucleus to emit, at the same emission time, radiation at energy $I_p+E_k$, and two weaker "duplicate" electromagnetic waves with energies $I_p+E_k-\tilde{q}\hbar\omega$ and $I_p+E_k+\tilde{q}\hbar\omega$ due to the ac-Stark effect. This correlation is kept also in the multi re-collision process and is manifested in the HGS: the structure (amplitude and phase) of the XUV harmonics $\Omega=(\tilde{q}\pm 2K)\omega$ is derived from the structure of the unmodified HGS. This is correct for any value of q̃ but is mostly easily seen when q̃ is sufficiently above the cut-off harmonic of the unmodified HGS, since in this case the XUV harmonics are separated and are not nested in the harmonics of the unmodified HGS.

Referring again to FIG. 9d, one observes that the structure of the XUV-HGS between the orders 54 and 74 resembles the structure of the unmodified HGS between the orders 1 and 21 (54−52−1=1, 74−52−1=21). In addition, within the XUV-HGS, the structure of harmonics between the orders 32 and 50 is a mirror-image (with respect to the 52nd harmonic) of the structure of harmonics between the orders 54 and 72. That is, the XUV-HGS consists of two new plateau-like regions (harmonics of order 38-50 and 54-66), derived from the same electronic trajectories which form the plateau of the unmodified HGS (harmonics of order 1-15), and two new cut-off-like regions (harmonics of order 32-36 and 68-74), derived from the same electronic trajectories which form the Cutoff harmonics of the unmodified HGS (harmonics of order 17-23). This structure of the XUV-HGS is invariant to the value of q̃.

One can also consider taking higher order terms in the Taylor expansion. Suppose, for example, that the second-order term in the Taylor expansion is considered:

$$\psi_b(r, t) \cong \qquad \text{(EQ. 2.27)}$$

$$e^{+\frac{i}{\hbar}I_p t} \left\{ \phi_1(r) + [\varepsilon_1^{out}\cos(\omega t) + \varepsilon_{\tilde{q}}^{out}\cos(\tilde{q}\omega t)]\frac{\partial}{\partial x}\phi_1(r) + [\varepsilon_1^{out}\cos(\omega t) + \varepsilon_{\tilde{q}}^{out}\cos(\tilde{q}\omega t)]^2 \frac{1}{2}\frac{\partial^2}{\partial x^2}\phi_1(r) \right\}$$

The time-dependent acceleration expectation value, keeping again only the bound-continuum terms, now reads:

$$a(t_r) = a^{(0)}(t_r) + [\varepsilon_1^{out}\cos(\omega t_r) + \varepsilon_{\tilde{q}}^{out}\cos(\tilde{q}\omega t_r)]a^{(1)}(t_r) + \qquad \text{(EQ. 2.28)}$$

$$[\varepsilon_1^{out}\cos(\omega t_r) + \varepsilon_{\tilde{q}}^{out}\cos(\tilde{q}\omega t_r)]^2 a^{(2)}(t_r)$$

$$= a^{(0)}(t_r) + \frac{[\varepsilon_1^{out}\cos(\omega t_r) + \varepsilon_{\tilde{q}}^{out}\cos(\tilde{q}\omega t_r)]^2}{} a^{(1)}(t_r) +$$

$$\left\{ \frac{(\varepsilon_1^{out})^2 + (\varepsilon_{\tilde{q}}^{out})^2}{2} + \frac{(\varepsilon_1^{out})^2}{2}\cos(2\omega t_r) + \frac{\varepsilon_1^{out}\varepsilon_{\tilde{q}}^{out}}{2}\cos[(\tilde{q}+1)\omega t_r] + \frac{\varepsilon_1^{out}\varepsilon_{\tilde{q}}^{out}}{2}\cos[(\tilde{q}-1)\omega t_r] + \frac{(\varepsilon_{\tilde{q}}^{out})^2}{2}\cos(2\tilde{q}\omega t_r) \right\} a^{(2)}(t_r)$$

where $$a^{(2)}(t_r) = \text{Re}\int_{-\infty}^{\infty} dk \tilde{\tilde{\psi}}^{(2)}(k, t_r) e^{-\frac{i}{\hbar}\left[I_p + \frac{\hbar^2 k^2}{2m}\right]t_r} \qquad \text{(EQ. 2.29)}$$

and where $$\tilde{\tilde{\psi}}^{(2)}(k, t_r) \equiv -\frac{1}{m}\frac{1}{\sqrt{2\pi}}\tilde{\psi}_c^{\parallel}(k, t_r)\int_{-\infty}^{\infty} d^3 r \frac{\partial^2 \phi_1(r)}{\partial x^2}\nabla V_0(r)\psi_c^+(y, z, t_r)e^{ikx}. \qquad \text{(EQ. 2.30)}$$

The new term $[\varepsilon_1^{out}\cos(\omega t_r) + \varepsilon_{\tilde{q}}^{out}\cos(\tilde{q}\omega t_r)]^2 a^{(2)}(t_r)$, which results from the inclusion of the second-order term in the Taylor expansion of the bound wavefunction, produces 10 weaker "duplicate" bursts of light in a single recollision event at t≈$t_r$. This is due to the fact that the term multiplying $a^{(2)}(t_r)$ has 5 different frequency components. These bursts of light are weaker than the one resulting from $a^{(0)}(t_r)$ or $[\varepsilon_1^{out}\cos(\omega t_r) + \varepsilon_{\tilde{q}}^{out}\cos(\tilde{q}\omega t_r)]a^{(1)}(t_r)$. Nevertheless, the last two bursts (resulting from $$\frac{(\varepsilon_{\tilde{q}}^{out})^2}{2}\cos(2\tilde{q}\omega t_r)a^{(2)}(t_r))$$

have a significant impact on the HGS since they are the a major source of new XUV harmonics which appear around the harmonic 2q̃.

It was already shown above that the term $a^{(0)}(t_r)$ contributes odd harmonics $\Omega=(2K-1)\omega$ to the HGS, the term $\varepsilon_1^{out}\cos(\omega t_r)a^{(1)}(t_r)$ also contributes odd harmonics $\Omega=(2K-1)\omega$ (with relative amplitude of the electric field of $\varepsilon_1^{out}$) but the term $\varepsilon_{\tilde{q}}^{out}\cos(\tilde{q}\omega t_r)a^{(1)}(t_r)$ contributes the XUV harmonics $\Omega=(\tilde{q}\pm 2K)\omega$. Under the assumption that $\phi_1(r)$ is symmetric, $$\frac{\partial^2 \phi_1(r)}{\partial x^2}$$

is also symmetric. Therefore, in analogy to the above discussion it can be shown that the term $a^{(2)}(t_r)$ contributes odd harmonics of $\omega$, since in two consecutive re-collision events at times $t_r$ and $t_r+T/2$ $a^{(2)}(t_r+T/2)=-a^{(2)}(t_r)$.

The term which is responsible for the emission, $[\varepsilon_1^{out}\cos(\omega t_r) + \varepsilon_{\tilde{q}}^{out}\cos(\tilde{q}\omega t_r)]^2 a^{(2)}(t_r)$ therefore gives rise to the appearance of the following five sets of harmonics (with the amplitudes given in square brackets): $\Omega=[0\pm(2K-1)]\omega=(2K-1)\omega$ $[(\varepsilon_1^{out})^2+(\varepsilon_{\tilde{q}}^{out})^2]$, $\Omega=[2\pm(2K-1)]\omega=(2K-1)\omega$ $[(\varepsilon_1^{out})^2]$, $\Omega=[\tilde{q}\pm(2K-1)]\omega=(\tilde{q}\pm 2K)\omega$ $[\varepsilon_1^{out}\varepsilon_{\tilde{q}}^{out}]$, $\Omega=[\tilde{q}-1\pm(2K-1)]\omega=[(\tilde{q}\pm 2K)]\omega=(\tilde{q}\pm 2K)\omega$ $[\varepsilon_1^{out}\varepsilon_{\tilde{q}}^{out}]$, $\Omega=[2\tilde{q}\pm(2K-1)]\omega$ $[(\varepsilon_{\tilde{q}}^{out})^2]$. Out of these five sets, the first four contribute harmonics which are masked, due to their low intensity, by harmonics of the unmodified HGS or by the XUV harmonics resulting from the lower-order term $\varepsilon_{\tilde{q}}^{out}\cos(\tilde{q}\omega t_r)a^{(1)}(t_r)$. The fifth set, however, contribute a new set of harmonics: $\Omega=[2\tilde{q}\pm(2K-1)]\omega$. This set is $$|(\varepsilon_{\tilde{q}}^{out})^2|^2 \approx \left(\frac{\varepsilon_{\tilde{q}}^{in}}{\tilde{q}^2\omega^2}\right)^4$$

-times weaker than harmonics of the unmodified HGS, or $|\epsilon_{\tilde{q}}^{out}|^2$-times weaker than the set $\Omega=(\tilde{q}\pm 2K)\omega$ of XUV harmonics, and is therefore distinguishable from these sets of harmonics by their intensity.

Figure 10:
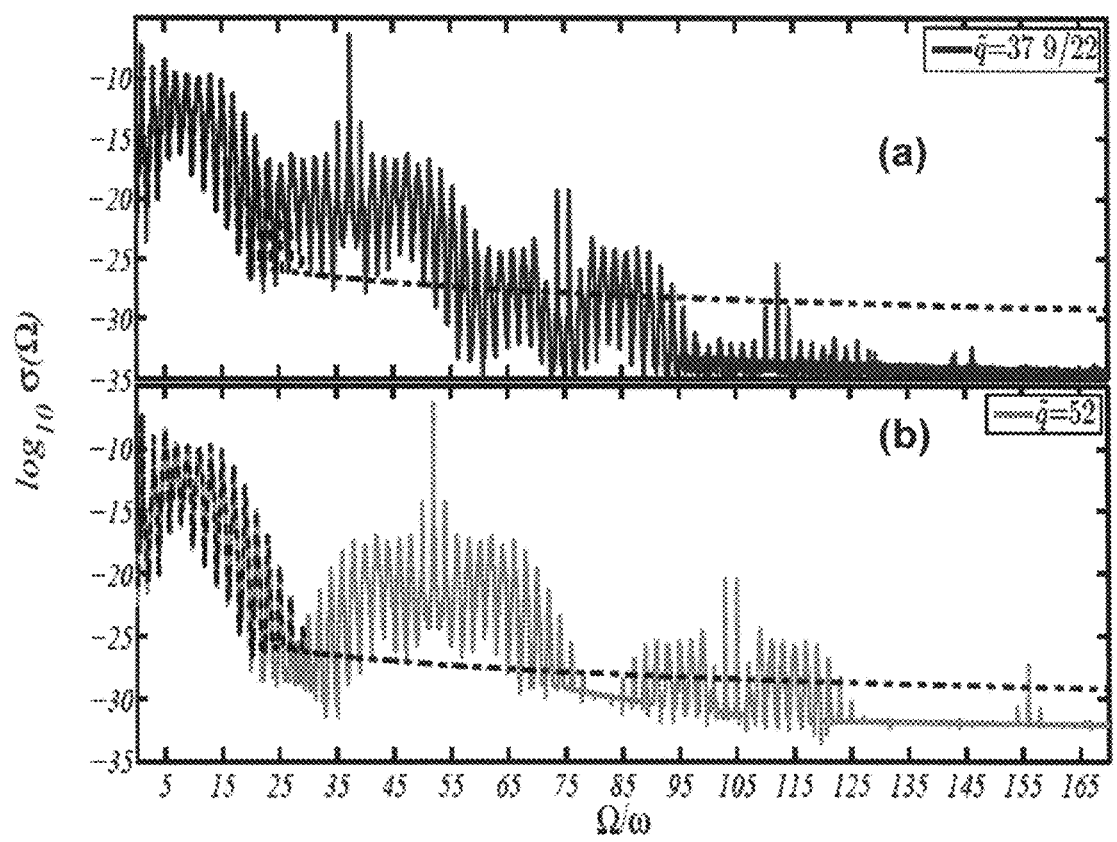

These harmonics are originated by the same electronic trajectories which produce the harmonics of the unmodified HGS, and their emission times are correlated with the ones of the IR harmonics. This is manifested in the HGS: the structure (amplitude and phase) of the new set of XUV harmonics $\Omega=[2\tilde{q}\pm(2K-1)]\omega$ in the XUV-HGS is derived from the structure of the IR-HGS. It consists of two new plateau-like regions, derived from the same electronic trajectories which form the plateau of the unmodified HGS, and two new cut-off-like regions, derived from the same electronic trajectories which form the cutoff harmonics of the unmodified HGS. This structure of the XUV-HGS is substantially invariant to the value of $\tilde{q}$, as shown in FIG. 10$b$.

By generalizing the procedure described before and taking higher-order terms in the Taylor expansion of the bound wavefunction, the present Inventor uncovered that the $n_{\tilde{q}}$-th order term contributes a new set of XUV harmonics $\Omega=[n_{\tilde{q}}\pm(2K-1+\mod(n_{\tilde{q}},2))]\omega$ which is $$|(\varepsilon_{\tilde{q}}^{out})^{n_q}|^2 \approx \left(\frac{\varepsilon_{\tilde{q}}^{in}}{\tilde{q}^2 \omega^2}\right)^{2n_{\tilde{q}}}$$

-times weaker than the harmonics of the unmodified HGS. Note that indeed in FIG. 10$b$ ($\tilde{q}=52$), the intensity of the plateau harmonics of the set $\Omega=(\tilde{q}\pm 2K)\omega$ is $$|\varepsilon_{\tilde{q}}^{out}|^2 \approx \left(\frac{\varepsilon_{\tilde{q}}^{in}}{\tilde{q}^2 \omega^2}\right)^2 = \left(\frac{0.0035}{52^2 0.05695^2}\right)^2 \approx 1.6 \cdot 10^{-7}$$

-times weaker than the plateau of the unmodified HGS, and the intensity of the plateau harmonics of the set $\Omega=[2\tilde{q}\pm(2K-1)]\omega$ is $|\epsilon_{\tilde{q}}^{out}|^4 \approx 2.5\cdot 10^{14}$-times weaker than the plateau of the unmodified HGS.

FIG. 13 is log-log plot of the intensity σ of different harmonics $\Omega=60$ (solid red line, dark gray line in grayscale), $\Omega=74$ (dashed green line, bright gray line in grayscale), $\Omega=89$ (dash-dotted blue line, line in grayscale), $\Omega=97$ (dotted cyan line, line in grayscale), obtained by the quantum mechanical simulation described above ($I_1^{in} \approx 4.299 \cdot 10^{13}$ W/cm$^2$, $\lambda=800$ nm) for $\tilde{q}=52$ and as function of the XUV field's amplitude $\epsilon_{\tilde{q}=52}^{in}$. The intensity of the XUV field varies between 0.005 a.u. ($I_{\tilde{q}=52}^{in} \approx 8.773 \cdot 10^{11}$ W/cm$^2$) and 0.007 a.u. ($I_{\tilde{q}=52}^{in} \approx 1.719 \cdot 10^{12}$ W/cm$^2$). As shown, all 4 lines graphs are linear.

FIG. 13 demonstrates that the intensity of harmonics from the set $\Omega=(\tilde{q}\pm 2K)\omega$ scale quadratically with ET, while harmonics from the set $\Omega=[2\tilde{q}\pm(2K-1)]\omega$ scale as $(\epsilon_{\tilde{q}}^{in})^4$. Specifically, according to FIG. 10$b$, the harmonics $\Omega=60$ and $\Omega=74$ belong to the set $\tilde{q}\pm 2K$ of XUV harmonics, and, as such, should depend on $\epsilon_{52}^{in}$ as $\sigma(\Omega=\tilde{q}\pm 2K)\propto(\epsilon_{52}^{in})^2$. This is in agreement with the slopes of the lines corresponding to $\Omega=60$ and $\Omega=74$ (2.000 and 2.0001, respectively). Similarly, the harmonics $\Omega=89$ and $\Omega=97$ belong to the set $2\tilde{q}\pm(2K-1)$ of XUV harmonics, and as such should depend on $\epsilon_{52}^{in}$ as $\sigma[\Omega=2\tilde{q}\pm(2K-1)]\propto(\epsilon_{52}^{in})^4$. This is in agreement with the slopes of the lines corresponding to $\Omega=89$ and $\Omega=97$ (4.0045 and 4.0015, respectively).

The obtained sets of XUV harmonics $\Omega=[n_{\tilde{q}}\tilde{q}\pm(2K-1+\mod(n_{\tilde{q}},2))]\omega$ are as predicted by the aforementioned selection-rules. Thus, the inclusion of higher-order terms in the Taylor expansion of the bound wavefunction, leads to the generalization of the semiclassical three-step model. This allows obtaining selection rules for the high harmonics which are obtained upon the addition of an XUV field to an IR field. Moreover, the intensities of the XUV harmonics can also be quantified.

The above theory predicts that both the IR and the XUV harmonics are emitted by the same IR trajectories and are therefore correlated in their emission times. This can be easily verified by analyzing the Gabor-transform (windowed Fourier transform) of the acceleration instead of the Fourier transform:

$$G_a(\Omega, t_0) = \frac{1}{NT}\int_0^{NT} a(t) e^{-\frac{(t-t_0)^2}{\tau^2}} e^{-i\Omega t} dt \qquad (EQ.\ 2.31)$$

where τ is the window's width. This analysis yields a mixed time-frequency signal, in which both frequency components and their time of appearance $t_0$ are present.

FIG. 14 shows the time-frequency distribution of high harmonics $$(\sigma(\Omega, t_0) \equiv \frac{2e^2}{3c^3}|G_a(\Omega, t_0)|^2)$$

obtained from the time-dependent acceleration expectation value whose spectra is given in FIG. 10$b$ ($\tilde{q}=52$), for the times 26T<t<27.5T. In FIG. 14, pink color (dark gray in grayscale) corresponds to high intensity, and yellow color (bright gray in grayscale) corresponds to low intensity.

In accordance with the semiclassical re-collision model, different harmonics are emitted repeatedly every half cycle. In accordance with the theory developed by the present Inventors, the time-frequency distribution of the new sets of XUV harmonics matches the time-frequency distribution of unmodified HGS, including the reflection symmetry of these sets (around $\tilde{q}$, $2\tilde{q}$ . . . ). The most visible demonstration of this property is shown for the cutoff harmonics of the unmodified HGS (the 15th-29th harmonic), who are emitted at times t≈0.710T+0.5 nT, in accordance with the semiclassical re-collision model. At those instants, also the 32nd-36th and the 68th-74th harmonics, which are the XUV cutoff harmonics of the set $\tilde{q}\pm 2K$, and also the 85th-87th and the 121st-125th harmonics, which are the XUV cutoff harmonics of the set $2\tilde{q}\pm(2K-1)$, are emitted. They are hence produced by the trajectories from which the IR cutoff harmonics originate.

This Example demonstrated that the addition of an XUV field to an IR field leads to the appearance of new harmonics in the HGS. The results of the semiclassical analysis and the quantum numerical simulations suggest that this is a single-atom phenomena. The XUV field induces ac-Stark modulations on the ground state and affects the recombination process of all returning trajectories, and leads to the generation of higher harmonics whose emission times and intensities are well related to the ones of the harmonics in the presence of the IR field alone. Using this mechanism, harmonics with unprecedented high frequencies can be obtained.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of generating light, comprising irradiating a substance with first optical field of a first frequency and second optical field of a second frequency,
    wherein the ratio between said second frequency and said first frequency is non-integer and wherein said second frequency is higher than a cutoff frequency of a harmonics generation spectrum characterizing the interaction of said substance with said first optical field.

2. The method of claim 1, wherein said first frequency is in the infrared range.

3. The method of claim 1, wherein said second frequency is in the ultraviolet range.

4. The method of claim 1, wherein said second frequency is in the extreme ultraviolet range.

5. The method of claim 1, wherein said second frequency is in the X-ray range.

6. The method of claim 1, wherein said first optical field has an intensity which is substantially higher than the intensity of said second optical field.

7. The method of claim 1, wherein said first optical field has an intensity which approximately equals the intensity of said second optical field.

8. The method of claim 1, wherein said first optical field has an intensity which is lower than the intensity of said second optical field.

9. The method of claim 1, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

10. Apparatus for generating light, comprising a substance, a first light source for generating in the direction of said substance first optical field of a first frequency and a second light source for generating in the direction of said substance second optical field of a second frequency, wherein the ratio between said second frequency and said first frequency is non-integer and wherein said second frequency is higher than a cutoff frequency of a harmonics generation spectrum characterizing the interaction of said substance with said first optical field.

11. An imaging system for imaging an object or a scene, comprising the apparatus of claim 10 arranged to direct light to the object or scene, and an imager configured for imaging the object or scene based on light emitted thereby, reflected therefrom or transmitted therethrough.

12. A spectroscopy system for determining the concentration of analyte in a sample, comprising the apparatus of claim 10 arranged to direct light to the sample, and a light detector configured for detecting light emitted by, reflected from or transmitted through the sample.

13. A lithography system, comprising the apparatus of claim 10 arranged to direct a light beam to a substrate to form patterns thereon, and alignment mechanism for aligning said substrate with said light beam.

14. A micro-machining system, comprising the apparatus of claim 10.

15. The apparatus of claim 10, wherein said first frequency is in the infrared range.

16. The apparatus of claim 10, wherein said second frequency is in the ultraviolet range.

17. The apparatus of claim 10, wherein said second frequency is in the extreme ultraviolet range.

18. The apparatus of claim 10, wherein said second frequency is in the X-ray range.

19. The apparatus of claim 10, wherein said first optical field has an intensity which is substantially higher than the intensity of said second optical field.

20. The apparatus of claim 10, wherein said first optical field has an intensity which approximately equals the intensity of said second optical field.

21. The apparatus of claim 10, wherein said first optical field has an intensity which is lower than the intensity of said second optical field.

22. The apparatus of claim 10, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

23. A method of generating light, comprising irradiating a substance with first optical field of a first frequency and second optical field of a second frequency, wherein the ratio between said second frequency and said first frequency is an integer and wherein the second frequency is higher than a cutoff frequency of a harmonics generation spectrum characterizing the interaction of said substance with said first optical field.

24. The method of claim 23, wherein said first frequency is in a range selected from the group consisting of the infrared range, the ultraviolet range, the extreme ultraviolet range, and the X-ray range.

25. The method of claim 23, wherein said first optical field has an intensity which is substantially higher than the intensity of said second optical field.

26. The method of claim 23, wherein said first optical field has an intensity which approximately equals the intensity of said second optical field.

27. The method of claim 23, wherein said first optical field has an intensity which is lower than the intensity of said second optical field.

28. The method of claim 23, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

29. Apparatus for generating light, comprising a substance, a first light source for generating in the direction of said substance first optical field of a first frequency and a second light source for generating in the direction of said substance second optical field of a second frequency, wherein the ratio between said second frequency and said first frequency is an integer, and wherein said second frequency is higher than a cutoff frequency of a harmonics generation spectrum characterizing the interaction of said substance with said first optical field.

30. An imaging system for imaging an object or a scene, comprising the apparatus of claim 29 arranged to direct light to the object or scene, and an imager configured for imaging the object or scene based on light emitted thereby, reflected therefrom or transmitted therethrough.

31. A spectroscopy system for determining the concentration of analyte in a sample, comprising the apparatus of claim 29 arranged to direct light to the sample, and a light detector configured for detecting light emitted by, reflected from or transmitted through the sample.

32. A lithography system, comprising the apparatus of claim 29 arranged to direct a light beam to a substrate to form patterns thereon, and alignment mechanism for aligning said substrate with said light beam.

33. A micro-machining system, comprising the apparatus of claim 29.

34. The apparatus of claim 29, wherein said first frequency is in a range selected from the group consisting of the infrared range, the ultraviolet range, the extreme ultraviolet range, and the X-ray range.

35. The apparatus of claim 29, wherein said first optical field has an intensity which is substantially higher than the intensity of said second optical field.

36. The apparatus of claim 29, wherein said first optical field has an intensity which approximately equals the intensity of said second optical field.

37. The apparatus of claim 29, wherein said first optical field has an intensity which is lower than the intensity of said second optical field.

38. The apparatus of claim 29, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

39. A method of generating light, comprising irradiating a substance with first optical field of a first frequency and second optical field of a second frequency, wherein said first optical field has an intensity which is lower or approximately equal the intensity of said second optical field, and wherein said second frequency is higher than a cutoff frequency of a harmonics generation spectrum characterizing the interaction of said substance with said first optical field.

40. The method of claim 39, wherein said first frequency is in a range selected from the group consisting of the infrared range, the ultraviolet range, the extreme ultraviolet range, and the X-ray range.

41. The method of claim 39, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

42. Apparatus for generating light, comprising a substance, a first light source for generating in the direction of said substance first optical field of a first frequency and a second light source for generating in the direction of said substance second optical field of a second frequency, wherein said first optical field has an intensity which is lower or approximately equal the intensity of said second optical field, and wherein said second frequency is higher than a cutoff frequency of a harmonics generation spectrum characterizing the interaction of said substance with said first optical field.

43. An imaging system for imaging an object or a scene, comprising the apparatus of claim 42 arranged to direct light to the object or scene, and an imager configured for imaging the object or scene based on light emitted thereby, reflected therefrom or transmitted therethrough.

44. A spectroscopy system for determining the concentration of analyte in a sample, comprising the apparatus of claim 42 arranged to direct light to the sample, and a light detector configured for detecting light emitted by, reflected from or transmitted through the sample.

45. A lithography system, comprising the apparatus of claim 42 arranged to direct a light beam to a substrate to form patterns thereon, and alignment mechanism for aligning said substrate with said light beam.

46. A micro-machining system, comprising the apparatus of claim 42.

47. The apparatus of claim 42, wherein said first frequency is in a range selected from the group consisting of the infrared range, the ultraviolet range, the extreme ultraviolet range, and the X-ray range.

48. The apparatus of claim 42, wherein a combination of said first optical field and said second optical field results in emission of a harmonics generation spectrum from said substance, said emitted harmonics generation spectrum having at least one harmonic which is enhanced relative to a respective harmonic of the harmonics generation spectrum that would have been emitted had said substance been irradiated solely by said first optical field.

\* \* \* \* \*